United States Patent
Yamagami

(10) Patent No.: US 9,097,881 B2
(45) Date of Patent: Aug. 4, 2015

(54) ZOOM LENS SYSTEM, OPTICAL APPARATUS AND METHOD FOR MANUFACTURING ZOOM LENS SYSTEM

(75) Inventor: Akira Yamagami, Kawasaki (JP)

(73) Assignee: Nikon Corporation, Tokyo (JP)

(*) Notice: Subject to any disclaimer, the term of this patent is extended or adjusted under 35 U.S.C. 154(b) by 160 days.

(21) Appl. No.: 13/189,684

(22) Filed: Jul. 25, 2011

(65) Prior Publication Data

US 2012/0019926 A1 Jan. 26, 2012

(30) Foreign Application Priority Data

Jul. 26, 2010 (JP) ................. 2010-167072
Jul. 26, 2010 (JP) ................. 2010-167084

(51) Int. Cl.
*G02B 15/177* (2006.01)
*G02B 15/16* (2006.01)
*G02B 27/64* (2006.01)

(52) U.S. Cl.
CPC ............ *G02B 15/177* (2013.01); *G02B 15/161* (2013.01); *G02B 27/646* (2013.01)

(58) Field of Classification Search
CPC ... G02B 15/177; G02B 15/161; G02B 27/646
USPC ........................ 359/691, 680–682
See application file for complete search history.

(56) References Cited

U.S. PATENT DOCUMENTS

| | | |
|---|---|---|
| 4,775,228 A | 10/1988 | Ikemori et al. |
| 5,276,553 A | 1/1994 | Tatsuno |
| 5,668,668 A | 9/1997 | Shibayama et al. |
| 5,715,097 A | 2/1998 | Shibayama et al. |
| 5,721,642 A | 2/1998 | Shibayama et al. |
| 5,798,871 A | 8/1998 | Shibayama et al. |
| 5,831,773 A | 11/1998 | Sato |
| 5,969,881 A | 10/1999 | Konno |
| 6,885,506 B2 * | 4/2005 | Yoneyama ............ 359/682 |
| 6,940,655 B2 | 9/2005 | Sato |
| 7,106,520 B2 * | 9/2006 | Saori ................. 359/681 |
| 7,280,284 B2 * | 10/2007 | Ishii ................. 359/680 |
| 7,982,965 B2 | 7/2011 | Muratani |
| 2003/0234985 A1 | 12/2003 | Sato |
| 2006/0139768 A1 * | 6/2006 | Saori ................. 359/691 |
| 2008/0212203 A1 * | 9/2008 | Taguchi et al. ......... 359/691 |
| 2010/0195214 A1 | 8/2010 | Muratani |

(Continued)

FOREIGN PATENT DOCUMENTS

| | | |
|---|---|---|
| JP | 61-91613 | 5/1986 |
| JP | 2-158708 | 6/1990 |

(Continued)

*Primary Examiner* — Jordan Schwartz
(74) *Attorney, Agent, or Firm* — Miles & Stockbridge P.C.

(57) ABSTRACT

A zoom lens system comprising, in order from an object side: a first lens group G1 having negative refractive power; and a second lens group G2 having positive refractive power, a distance between the first lens group and the second lens group varying upon zooming from a wide-angle end state to a telephoto end state, the first lens group G1 including, in order from the object side, a first lens component having negative refractive power, a second lens component having negative refractive power, a third lens component having positive refractive power, and a fourth lens component having positive refractive power, thereby providing a downsized zoom lens system having excellent optical performance, an optical apparatus equipped therewith and a method for manufacturing the zoom lens system.

20 Claims, 27 Drawing Sheets

(56) References Cited

U.S. PATENT DOCUMENTS

| | | | | |
|---|---|---|---|---|
| 2011/0134537 | A1* | 6/2011 | Muratani | 359/680 |
| 2011/0141575 | A1 | 6/2011 | Muratani et al. | |

FOREIGN PATENT DOCUMENTS

| JP | 5-173071 | 7/1993 |
|---|---|---|
| JP | 8-304704 | 11/1996 |
| JP | 8-327907 | 12/1996 |
| JP | 9-171140 | 6/1997 |
| JP | 10-161024 | 6/1998 |
| JP | 2002-62477 | 2/2002 |
| JP | 2004-21223 | 1/2004 |
| JP | 2004-258511 | 9/2004 |
| JP | 2007-279232 | 10/2007 |
| JP | 2008-233284 | 10/2008 |
| JP | 2010-44225 | 2/2010 |
| JP | 2010-44226 | 2/2010 |
| JP | 2010-44227 | 2/2010 |
| JP | 2010-44228 | 2/2010 |
| JP | WO 2010/018838 * | 2/2010 |
| JP | 2010-181518 | 8/2010 |

* cited by examiner

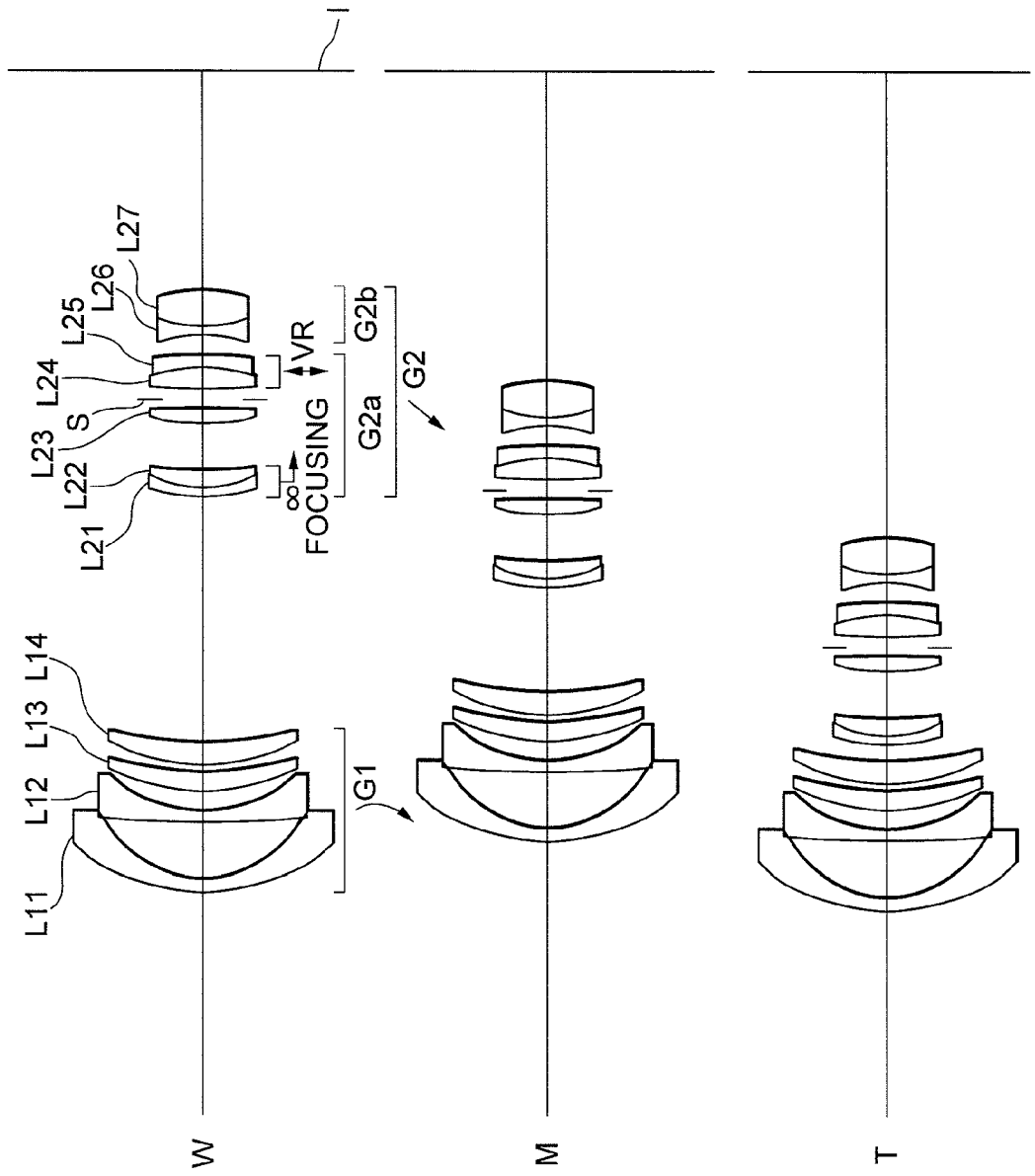

FIG. 3A
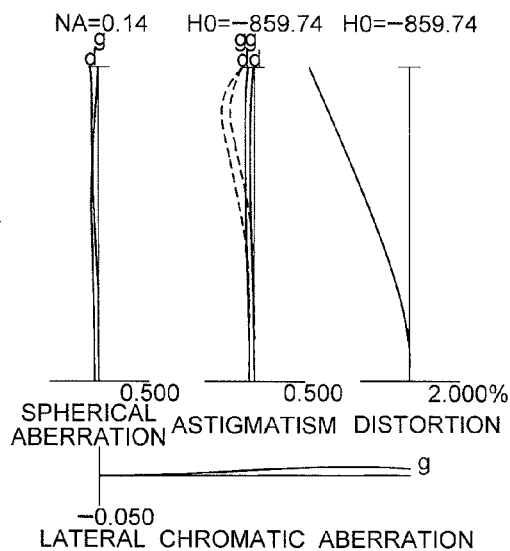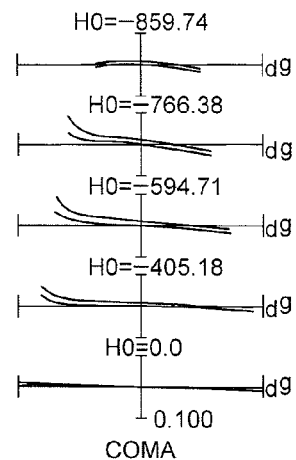
FIG. 3B
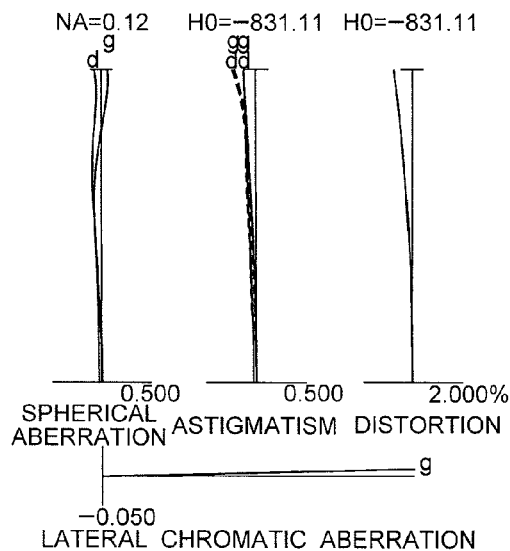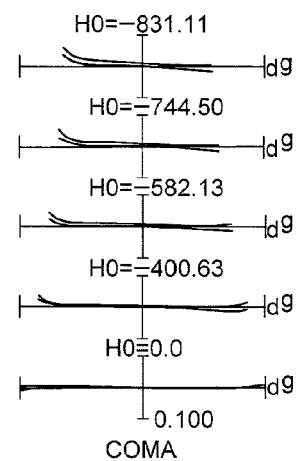
FIG. 3C
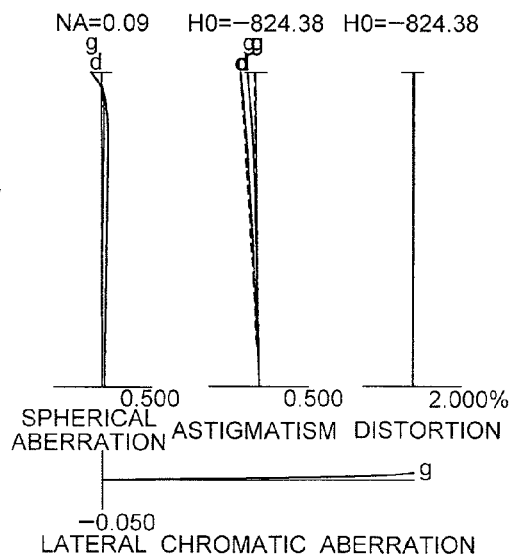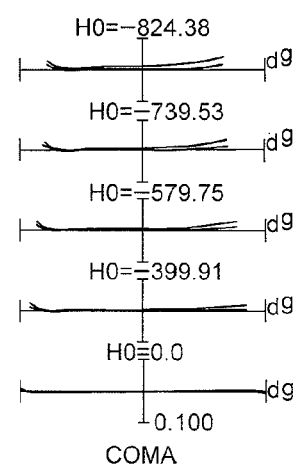

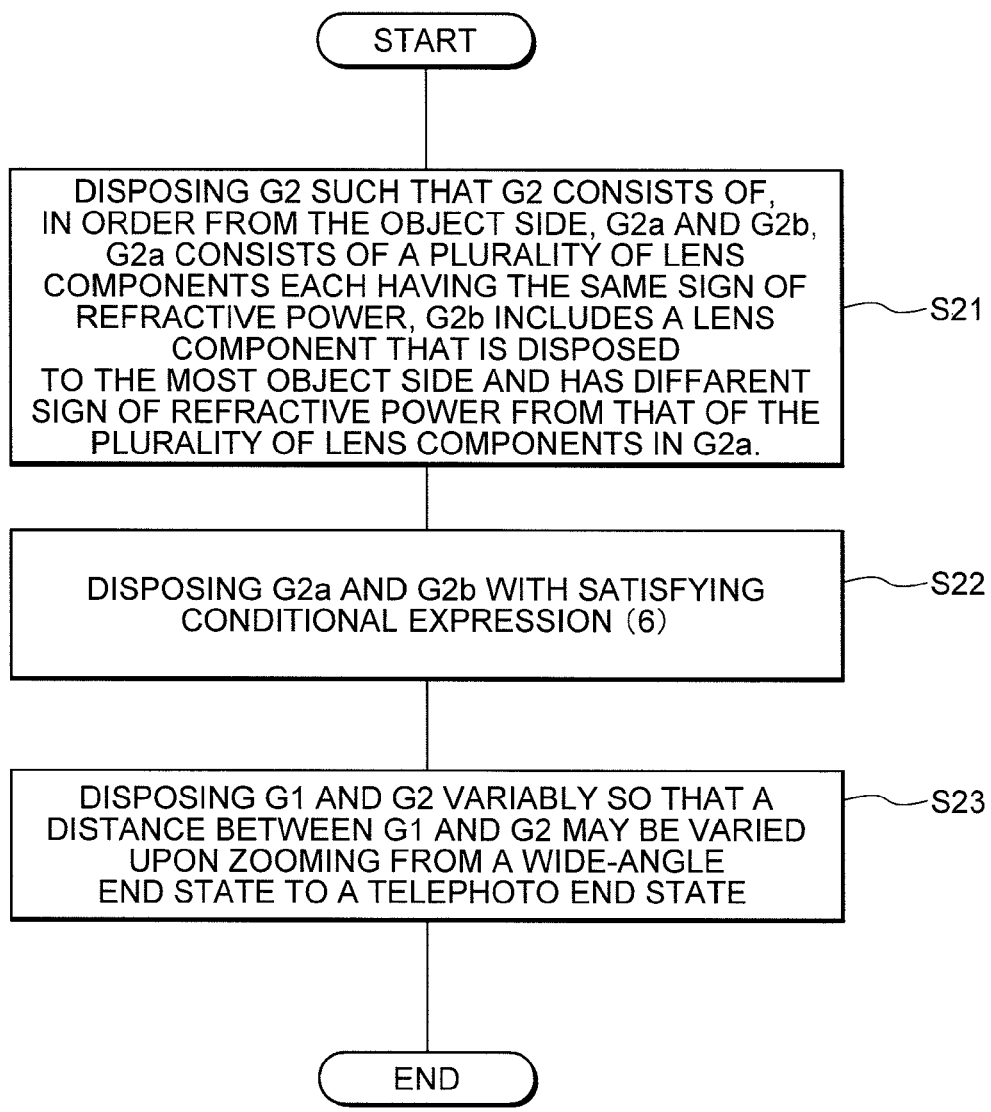

ZOOM LENS SYSTEM, OPTICAL APPARATUS AND METHOD FOR MANUFACTURING ZOOM LENS SYSTEM

The disclosure of the following priority applications are herein incorporated by reference:

Japanese Patent Application No. 2010-167072 filed on Jul. 26, 2010, and

Japanese Patent Application No. 2010-167084 filed on Jul. 26, 2010.

BACKGROUND OF THE INVENTION

1. Field of the Invention

The present invention relates to a zoom lens system, an optical apparatus equipped with the zoom lens system, and a method for manufacturing the zoom lens system.

2. Related Background Art

There have been proposed zoom lens systems suitable for a film camera, an electronic still camera, a video camera, and the like disclosed in such as Japanese Patent Application Laid-Open No. 2004-21223. However, the conventional zoom lens system has had a problem that the zoom lens system is large in dimension not having sufficient optical performance.

SUMMARY OF THE INVENTION

The present invention is made in view of the above-described problem, and has an object to provide a downsized zoom lens system having excellent optical performance, an optical apparatus equipped with the zoom lens system, and a method for manufacturing the zoom lens system.

According to a first aspect of the present invention, there is provided a zoom lens system comprising, in order from an object side: a first lens group having negative refractive power; and a second lens group having positive refractive power, a distance between the first lens group and the second lens group varying upon zooming from a wide-angle end state to a telephoto end state, and the first lens group including, in order from the object side, a first lens component having negative refractive power, a second lens component having negative refractive power, a third lens component having positive refractive power, and a fourth lens component having positive refractive power.

According to a second aspect of the present invention, there is provided an optical apparatus equipped with the zoom lens system according to the first aspect.

According to a third aspect of the present invention, there is provided a zoom lens system comprising, in order from an object side: a first lens group; and a second lens group, a distance between the first lens group and the second lens group varying upon zooming from a wide-angle end state to a telephoto end state, the second lens group consisting of, in order from the object side, a front sub-lens group and a rear sub-lens group, the front sub-lens group consisting of a plurality of lens components having the same sign of refractive power, the rear sub-lens group including a lens component that is disposed to the most object side and has a different sign of refractive power from the sign of refractive power of the plurality of lens components in the front sub-lens group, and the following conditional expression (6) being satisfied:

$$0.20 < \Sigma 2a / \Sigma 2b < 18.00 \qquad (6)$$

where $\Sigma 2a$ denotes a distance along an optical axis between the object side lens surface of a lens component disposed to the most object side in the front sub-lens group and the image side lens surface of a lens component disposed to the most image side in the front sub-lens group, and $\Sigma 2b$ denotes a distance along the optical axis between the object side lens surface of a lens component disposed to the most object side in the rear sub-lens group and a image side lens surface of a lens component disposed to the most image side in the rear sub-lens group.

According to a fourth aspect of the present invention, there is provided an optical apparatus equipped with the zoom lens system according to the third aspect.

According to a fifth aspect of the present invention, there is provided a method for manufacturing a zoom lens system including, in order from an object side, a first lens group having negative refractive power and a second lens group having positive refractive power, the method comprising steps of: disposing the first lens group that includes, in order from the object side, a first lens component having negative refractive power, a second lens component having negative refractive power, a third lens component having positive refractive power and a fourth lens component having positive refractive power; and disposing the first lens group and the second lens group movably so that a distance between the first lens group and the second lens group may be varied upon zooming from a wide-angle end state to a telephoto end state.

According to a sixth aspect of the present invention, there is provided a method for manufacturing a zoom lens system including, in order from an object side, a first lens group and a second lens group, the method comprising steps of: disposing the second lens group such that the second lens group consists of, in order from the object side, a front sub-lens group and a rear sub-lens group, the front sub-lens group consists of a plurality of lens components each having the same sign of refractive power, the rear sub-lens group includes a lens component that is disposed to the most object side and has a different sign of refractive power from the sign of refractive power of the plurality of lens components in the front sub-lens group; disposing the front sub-lens group and the rear sub-lens group with satisfying the following conditional expression (6):

$$0.20 < \Sigma 2a / \Sigma 2b < 18.00 \qquad (6)$$

where $\Sigma 2a$ denotes a distance along an optical axis between the object side lens surface of a lens component disposed to the most object side in the front sub-lens group and the image side lens surface of a lens component disposed to the most image side in the front sub-lens group, and $\Sigma 2b$ denotes a distance along the optical axis between the object side lens surface of a lens component disposed to the most object side in the rear sub-lens group and the image side lens surface of a lens component disposed to the most image side in the rear sub-lens group; and disposing the first lens group and the second lens group movably so that a distance between the first lens group and the second lens group may be varied upon zooming from a wide-angle end state to a telephoto end state.

The present invention makes it possible to provide a downsized zoom lens system having excellent optical performance, an optical apparatus equipped with the zoom lens system, and a method for manufacturing the zoom lens system.

BRIEF DESCRIPTION OF THE DRAWINGS

FIG. 1 is a sectional view showing a lens configuration of a zoom lens system according to Example 1 of the present application.

FIGS. 2A, 2B, and 2C are graphs showing various aberrations of the zoom lens system according to Example 1 focusing on an infinitely distant object, in which FIG. 2A is in a wide-angle end state, FIG. 2B is in an intermediate focal length state, and FIG. 2C is in a telephoto end state.

FIGS. 3A, 3B, and 3C are graphs showing various aberrations of the zoom lens system according to Example 1 focusing on a close object (shooting magnification=−0.01), in which FIG. 3A is in the wide-angle end state, FIG. 3B is in the intermediate focal length state, and FIG. 3C is in the telephoto end state.

FIGS. 4A, and 4B are graphs showing coma of the zoom lens system according to Example 1 upon shifting a shift lens group (±0.1 mm) focusing on an infinitely distant object, in which FIG. 4A is in the wide-angle end state, and FIG. 4B is in the telephoto end state.

FIGS. 6A, 6B, and 6C are graphs showing various aberrations of the zoom lens system according to Example 2 focusing on an infinitely distant object, in which FIG. 6A is in a wide-angle end state, FIG. 6B is in an intermediate focal length state, and FIG. 6C is in a telephoto end state.

FIGS. 7A, 7B, and 7C are graphs showing various aberrations of the zoom lens system according to Example 2 focusing on a close object (shooting magnification=−0.01), in which FIG. 7A is in the wide-angle end state, FIG. 7B is in the intermediate focal length state, and FIG. 7C is in the telephoto end state.

FIGS. 8A, and 8B are graphs showing coma of the zoom lens system according to Example 2 upon shifting a shift lens group (±0.1 mm) focusing on an infinitely distant object, in which FIG. 8A is in the wide-angle end state, and FIG. 8B is in the telephoto end state.

FIGS. 10A, 10B, and 10O are graphs showing various aberrations of the zoom lens system according to Example 3 focusing on an infinitely distant object, in which FIG. 10A is in a wide-angle end state, FIG. 10B is in an intermediate focal length state, and FIG. 10O is in a telephoto end state.

FIGS. 11A, 11B, and 11C are graphs showing various aberrations of the zoom lens system according to Example 3 focusing on a close object (shooting magnification=−0.01), in which FIG. 11A is in the wide-angle end state, FIG. 11B is in the intermediate focal length state, and FIG. 11C is in the telephoto end state.

FIGS. 12A, and 12B are graphs showing coma of the zoom lens system according to Example 3 upon shifting a shift lens group (±0.1 mm) focusing on an infinitely distant object, in which FIG. 12A is in the wide-angle end state, and FIG. 12B is in the telephoto end state.

FIGS. 14A, 14B, and 14C are graphs showing various aberrations of the zoom lens system according to Example 4 focusing on an infinitely distant object, in which FIG. 14A is in a wide-angle end state, FIG. 14B is in an intermediate focal length state, and FIG. 14C is in a telephoto end state.

FIGS. 15A, 15B, and 15C are graphs showing various aberrations of the zoom lens system according to Example 4 focusing on a close object (shooting magnification=−0.01), in which FIG. 15A is in the wide-angle end state, FIG. 15B is in the intermediate focal length state, and FIG. 15C is in the telephoto end state.

FIGS. 16A, and 16B are graphs showing coma of the zoom lens system according to Example 4 upon shifting a shift lens group (±0.1 mm) focusing on an infinitely distant object, in which FIG. 16A is in the wide-angle end state, and FIG. 16B is in the telephoto end state.

FIGS. 18A, 18B, and 18C are graphs showing various aberrations of the zoom lens system seen from another point of view according to Example 5 focusing on an infinitely distant object, in which FIG. 18A is in a wide-angle end state, FIG. 18B is in an intermediate focal length state, and FIG. 18C is in a telephoto end state.

FIGS. 19A, 19B, and 19C are graphs showing various aberrations of the zoom lens system seen from another point of view according to Example 5 focusing on a close object (shooting magnification=−0.01), in which FIG. 19A is in the wide-angle end state, FIG. 19B is in the intermediate focal length state, and FIG. 19C is in the telephoto end state.

FIGS. 20A, and 20B are graphs showing coma of the zoom lens system seen from another point of view according to Example 5 upon shifting a shift lens group (±0.1 mm) focusing on an infinitely distant object, in which FIG. 20A is in the wide-angle end state, and FIG. 20B is in the telephoto end state.

FIGS. 22A, 22B, and 22C are graphs showing various aberrations of the zoom lens system seen from another point of view according to Example 6 focusing on an infinitely distant object, in which FIG. 22A is in a wide-angle end state, FIG. 22B is in an intermediate focal length state, and FIG. 22C is in a telephoto end state.

FIGS. 23A, 23B, and 23C are graphs showing various aberrations of the zoom lens system seen from another point of view according to Example 6 focusing on a close object (shooting magnification=−0.01), in which FIG. 23A is in the wide-angle end state, FIG. 23B is in the intermediate focal length state, and FIG. 23C is in the telephoto end state.

FIGS. 24A, and 24B are graphs showing coma of the zoom lens system seen from another point of view according to Example 6 upon shifting a shift lens group (±0.1 mm) focusing on an infinitely distant object, in which FIG. 24A is in the wide-angle end state, and FIG. 24B is in the telephoto end state.

FIG. 27 is a flowchart schematically explaining a method for manufacturing the zoom lens system seen from another point of view according to the present application.

DESCRIPTION OF THE MOST PREFERRED EMBODIMENT

Figure 2A:
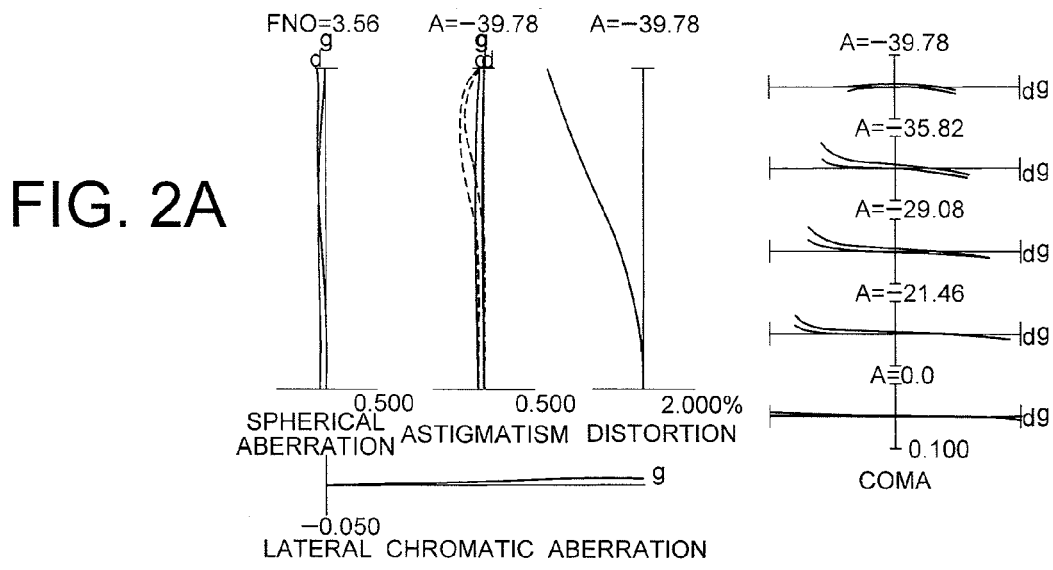

A zoom lens system according to the present application, an optical apparatus equipped therewith and a method for manufacturing the zoom lens system are explained below.

A zoom lens system according to the present application includes, in order from an object side, a first lens group having negative refractive power and a second lens group having positive refractive power. A distance between the first lens group and the second lens group varies upon zooming from a wide-angle end state to a telephoto end state. The first lens group includes, in order from the object side, a first lens component having negative refractive power, a second lens component having negative refractive power, a third lens component having positive refractive power, and a fourth lens component having positive refractive power.

With the above-described configuration, a zoom lens system according to the present application makes it possible to excellently correct curvature of field, distortion and spherical aberration with downsizing the zoom lens system. Incidentally, a lens component means a single lens or a cemented lens constructed by cementing two lenses or more.

With this configuration, it becomes possible to realize a downsized zoom lens system having excellent optical performance.

In a zoom lens system according to the present application, the following conditional expression (1) is preferably satisfied:

$$1.15 < (-f1)/fw < 2.00 \qquad (1)$$

where f1 denotes a focal length of the first lens group, and fw denotes a focal length of the zoom lens system in the wide-angle end state.

Conditional expression (1) defines an appropriate range of a ratio of the focal length of the first lens group to that of the zoom lens system in the wide-angle end state. With satisfying conditional expression (1), a zoom lens system according to the present application makes it possible to excellently correct curvature of field, distortion and spherical aberration. Moreover, control of movement of the first lens group becomes easy, so that the whole of the zoom lens system can be prevented from getting larger.

When the ratio (-f1)/fw is equal to or exceeds the upper limit of conditional expression (1), the focal length of the first lens group becomes large. Accordingly, a moving amount of the first lens group upon zooming from the wide-angle end state to the telephoto end state becomes large, and the total lens length of the zoom lens system becomes large, so that it is undesirable. Moreover, curvature of field and distortion generated in the first lens component cannot be sufficiently corrected, so that it is undesirable.

In order to secure the effect of the present application, it is preferable to set the upper limit of conditional expression (1) to 1.93 or less. In order to further secure the effect of the present application, it is greatly preferable to set the upper limit of conditional expression (1) to 1.85 or less. In order to further secure the effect of the present application, it is greatly preferable to set the upper limit of conditional expression (1) to 1.78 or less. In order to still further secure the effect of the present application, it is most preferable to set the upper limit of conditional expression (1) to 1.70 or less.

On the other hand, when the ratio (-f1)/fw is equal to or falls below the lower limit of conditional expression (1), the focal length of the first lens group becomes small. Accordingly, curvature of field and distortion generated in the first lens component become large, so that it is undesirable. The moving amount of the first lens group upon zooming from the wide-angle end state to the telephoto end state becomes small, and the movement of the first lens group becomes difficult to be controlled, so that it is undesirable.

In order to secure the effect of the present application, it is preferable to set the lower limit of conditional expression (1) to 1.26 or more. In order to further secure the effect of the present application, it is greatly preferable to set the lower limit of conditional expression (1) to 1.38 or more. In order to further secure the effect of the present application, it is greatly preferable to set the lower limit of conditional expression (1) to 1.49 or more. In order to still further secure the effect of the present application, it is most preferable to set the lower limit of conditional expression (1) to 1.60 or more.

In a zoom lens system according to the present application, the following conditional expression (2) is preferably satisfied:

$$0.45 < (-f1)/ft < 0.90 \qquad (2)$$

where f1 denotes a focal length of the first lens group, and ft denotes a focal length of the zoom lens system in the telephoto end state.

Conditional expression (2) defines an appropriate range of a ratio of focal length of the first lens group to that of the zoom lens system in the telephoto end state. With satisfying conditional expression (2), the zoom lens system according to the present application makes it possible to excellently correct curvature of field. Moreover, the movement of the first lens group becomes easy to be controlled, so that the whole of the zoom lens system can be prevented from getting larger.

When the ratio (-f1)/ft is equal to or exceeds the upper limit of conditional expression (2), the focal length of the first lens group becomes large. Accordingly, the moving amount of the first lens group upon zooming from the wide-angle end state to the telephoto end state becomes large, and the total lens length of the zoom lens system becomes large, so that it is undesirable. Moreover, curvature of field generated in the first lens component cannot be sufficiently corrected, so that it is undesirable.

In order to secure the effect of the present application, it is preferable to set the upper limit of conditional expression (2) to 0.82 or less. In order to further secure the effect of the present application, it is greatly preferable to set the upper limit of conditional expression (2) to 0.74 or less. In order to further secure the effect of the present application, it is greatly preferable to set the upper limit of conditional expression (2) to 0.66 or less. In order to still further secure the effect of the present application, it is most preferable to set the upper limit of conditional expression (2) to 0.59 or less.

On the other hand, when the ratio (-f1)/ft is equal to or falls below the lower limit of conditional expression (2), the focal length of the first lens group becomes small. Accordingly, curvature of field generated in the first lens component becomes large, so that it is undesirable. Moreover, the moving amount of the first lens group upon zooming from the wide-angle end state to the telephoto end state becomes small, so that the movement of the first lens group becomes difficult to be controlled. Accordingly, it is undesirable.

In order to secure the effect of the present application, it is preferable to set the lower limit of conditional expression (2) to 0.48 or more. In order to further secure the effect of the present application, it is greatly preferable to set the lower limit of conditional expression (2) to 0.51 or more. In order to further secure the effect of the present application, it is greatly preferable to set the lower limit of conditional expression (2) to 0.54 or more. In order to still further secure the effect of the present application, it is most preferable to set the lower limit of conditional expression (2) to 0.56 or more.

In a zoom lens system according to the present application, each of the first lens component, the third lens component and the fourth lens component in the first lens group preferably has a meniscus shape. With this configuration, spherical aberration and curvature of field generated in the first lens group can be excellently corrected.

In a zoom lens system according to the present application, each of the first lens component, the third lens component and the fourth lens component in the first lens group preferably has a meniscus shape having a convex surface facing the object side. With this configuration, spherical aberration and curvature of field generated in the first lens group can be further excellently corrected.

In a zoom lens system according to the present application, the first lens component in the first lens group preferably includes an aspherical surface. With this configuration, astigmatism and distortion generated in the first lens group can be mitigated with downsizing the zoom lens system.

A zoom lens system according to the present application includes a focusing lens group that moves along the optical axis to carry out focusing from an infinitely distant object to a close object, and the following conditional expression (3) is preferably satisfied:

$$0.15<|fw/ff|<0.45 \qquad (3)$$

where fw denotes a focal length of the zoom lens system in the wide-angle end state, and ff denotes a focal length of the focusing lens group.

Conditional expression (3) defines an appropriate range of a ratio of the focal length of the zoom lens system in the wide-angle end state to that of the focusing lens group. In a zoom lens system according to the present application, with satisfying conditional expression (3), it becomes possible to excellently correct spherical aberration and coma. Moreover, positional control of the focusing lens group becomes easy, and the zoom lens system can be prevented from getting larger.

When the value |fw/ff| is equal to or exceeds the upper limit of conditional expression (3), the focal length of the focusing lens group becomes small with respect to the focal length of the zoom lens system in the wide-angle end state, so that the positional control of the focusing lens group becomes difficult. Accordingly, it becomes difficult to sufficiently secure focusing accuracy, so that it is undesirable. Moreover, spherical aberration and coma are generated in the focusing lens group, so that it is undesirable.

In order to secure the effect of the present application, it is preferable to set the upper limit of conditional expression (3) to 0.43 or less. In order to further secure the effect of the present application, it is greatly preferable to set the upper limit of conditional expression (3) to 0.41 or less. In order to still further secure the effect of the present application, it is most preferable to set the upper limit of conditional expression (3) to 0.38 or less.

On the other hand, when the value |fw/ff| is equal to or falls below the lower limit of conditional expression (3), the focal length of the focusing lens group becomes large with respect to the focal length of the zoom lens system in the wide-angle end state, so that a moving amount of the focusing lens group upon focusing becomes large. Accordingly, the total lens length of the zoom lens system becomes large, the diameter of the zoom lens system becomes large, and the whole of the zoom lens system becomes large, so that it is undesirable. Moreover, spherical aberration and coma generated in the focusing lens group become difficult to be sufficiently corrected, so that it is undesirable.

In order to secure the effect of the present application, it is preferable to set the lower limit of conditional expression (3) to 0.17 or more. In order to further secure the effect of the present application, it is greatly preferable to set the lower limit of conditional expression (3) to 0.19 or more. In order to still further secure the effect of the present application, it is greatly preferable to set the lower limit of conditional expression (3) to 0.21 or more. In order to still further secure the effect of the present application, it is most preferable to set the lower limit of conditional expression (3) to 0.23 or more.

In a zoom lens system according to the present application, at least a portion of the second lens group is preferably moved as a focusing lens group along the optical axis. With this configuration, variations in spherical aberration and curvature of field generated upon focusing from an infinitely distant object to a close object can be excellently corrected in the second lens group.

In a zoom lens system according to the present application, the following conditional expression (4) is preferably satisfied:

$$0.15<|f\gamma w|<0.60 \qquad (4)$$

where fγw denotes an image-plane-moving coefficient of the focusing lens group in the wide-angle end state.

Conditional expression (4) defines an appropriate range of the image-plane-moving coefficient, which is a ratio of a moving amount of the image plane with respect to a moving amount of the focusing lens group, in the wide-angle end state. With satisfying conditional expression (4), a zoom lens system according to the present application makes it possible to suppress variation in optical performance upon focusing on an infinitely distant object to a close object in the lowest level. Moreover, positional control of the focusing lens group and the shift lens group becomes easy, and the whole of the zoom lens system can be prevented from getting larger.

When the value |fγw| is equal to or exceeds the upper limit of conditional expression (4), the focal length of the focusing lens group becomes large, so that the moving amount of the focusing lens group upon focusing becomes large. Accordingly, the total lens length of the zoom lens system becomes large, the diameter of the zoom lens system becomes large, and the whole of the zoom lens system becomes large, so that it is undesirable. Moreover, spherical aberration and coma generated in the focusing lens group become difficult to be sufficiently corrected, so that it is undesirable.

In order to secure the effect of the present application, it is preferable to set the upper limit of conditional expression (4) to 0.58 or less. In order to further secure the effect of the present application, it is greatly preferable to set the upper limit of conditional expression (4) to 0.55 or less. In order to still further secure the effect of the present application, it is most preferable to set the upper limit of conditional expression (4) to 0.53 or less.

On the other hand, when the value |fγw| is equal to or falls below the lower limit of conditional expression (4), the focal length of the focusing lens group becomes small, so that the positional control of the focusing lens group becomes difficult. Accordingly, it becomes difficult to sufficiently secure focusing accuracy, so that it is undesirable. Moreover, spherical aberration and coma are generated in the focusing lens group, so that it is undesirable.

In order to secure the effect of the present application, it is preferable to set the lower limit of conditional expression (4) to 0.18 or more. In order to further secure the effect of the present application, it is greatly preferable to set the lower limit of conditional expression (4) to 0.22 or more. In order to still further secure the effect of the present application, it is most preferable to set the lower limit of conditional expression (4) to 0.25 or more.

In a zoom lens system according to the present application, at least a portion of the second lens group is preferably moved as a shift lens group in a direction including a component perpendicular to the optical axis. With this configuration, an image blur caused by a camera shake or the like can be corrected (vibration reduction). With using at least a portion of the second lens group as a shift lens group, coma generated in the shift lens group can be corrected by the other lens components in the second lens group, so that variation in coma upon moving the shift lens group in a direction including a component perpendicular to the optical axis can be suppressed.

In a zoom lens system according to the present application, the following conditional expression (5) is preferably satisfied:

$$-3.70 < ff/fs < 3.10 \tag{5}$$

where ff denotes a focal length of the focusing lens group, and fs denotes a focal length of the shift lens group.

Conditional expression (5) defines an appropriate range of the ratio of the focal length of the focusing lens group to that of the shift lens group. With satisfying conditional expression (5), the zoom lens system according to the present application makes it possible to excellently correct spherical aberration, coma and curvature of field. Moreover, positional control of the focusing lens group and the shift lens group becomes easy, and the zoom lens system can be prevented from getting larger.

When the ratio ff/fs is equal to or exceeds the upper limit of conditional expression (5), the focal length of the focusing lens group becomes large, so that the moving amount of the focusing lens group upon focusing becomes large. Accordingly, the total lens length of the zoom lens system becomes large, the diameter of the zoom lens system becomes large, and the whole of the zoom lens system becomes large, so that it is undesirable. Moreover, spherical aberration and coma generated in the focusing lens group become difficult to be sufficiently corrected, so that it is undesirable. Moreover, the focal length of the shift lens group becomes small, so that positional control of the shift lens group becomes difficult. Accordingly, accuracy for correcting the image blur cannot be sufficiently secured, so that it is undesirable. Moreover, coma and decentering coma become difficult to be corrected.

In order to secure the effect of the present application, it is preferable to set the upper limit of conditional expression (5) to 2.68 or less. In order to further secure the effect of the present application, it is greatly preferable to set the upper limit of conditional expression (5) to 2.25 or less. In order to still further secure the effect of the present application, it is most preferable to set the upper limit of conditional expression (5) to 1.83 or less.

On the other hand, when the ratio ff/fs is equal to or falls below the lower limit of conditional expression (5), the focal length of the focusing lens group becomes small, so that the positional control of the focusing lens group becomes difficult. Accordingly, it becomes difficult to sufficiently secure focusing accuracy, so that it is undesirable. Moreover, spherical aberration and coma are generated in the focusing lens group, so that it is undesirable. Moreover, the focal length of the shift lens group becomes large, so that the shift lens group has to be moved widely to correct an image blur. Accordingly, the shift lens group becomes large, so that it is undesirable. Moreover, coma and curvature of field cannot be sufficiently corrected, so that it is undesirable.

In order to secure the effect of the present application, it is preferable to set the lower limit of conditional expression (5) to −3.27 or more. In order to further secure the effect of the present application, it is greatly preferable to set the lower limit of conditional expression (5) to −2.84 or more. In order to still further secure the effect of the present application, it is most preferable to set the lower limit of conditional expression (5) to −2.41 or more.

An optical apparatus according to the present application is equipped with the zoom lens system according to the present application. With this configuration, it becomes possible to realize a downsized optical apparatus having excellent optical performance.

A method for manufacturing a zoom lens system according to the present application is a method for manufacturing a zoom lens system including, in order from an object side, a first lens group having negative refractive power and a second lens group having positive refractive power. Disposing the first lens group that includes, in order from the object side, a first lens component having negative refractive power, a second lens component having negative refractive power, a third lens component having positive refractive power, and a fourth lens component having positive refractive power. Disposing the first lens group and the second lens group movably so that a distance between the first lens group and the second lens group may be varied upon zooming from a wide-angle end state to a telephoto end state.

With the method for manufacturing a zoom lens system according to the present application, it becomes possible to manufacture a downsized zoom lens system having excellent optical performance.

Then, a zoom lens system, an optical apparatus equipped with the zoom lens system, and a method for manufacturing the zoom lens system seen from another point of view according to the present application are explained below.

A zoom lens system seen from another point of view according to the present application includes, in order from an object side, a first lens group and a second lens group. Upon zooming from a wide-angle end state to a telephoto end state, a distance between the first lens group and the second lens group varies. The second lens group consists of, in order from the object side, a front sub-lens group and a rear sub-lens group. The front sub-lens group consists of a plurality of lens components having the same sign of refractive power. The rear sub-lens group includes a lens component that is disposed to the most object side and has a different sign of refractive power from the sign of refractive power of the plurality of lens components in the front sub-lens group. The following conditional expression (6) is satisfied:

$$0.20 < \Sigma 2a/\Sigma 2b < 18.00 \tag{6}$$

where $\Sigma 2a$ denotes a distance along an optical axis between the object side lens surface of a lens component disposed to the most object side in the front sub-lens group and the image side lens surface of a lens component disposed to the most image side in the front sub-lens group, and $\Sigma 2b$ denotes a distance along the optical axis between the object side lens surface of a lens component disposed to the most object side in the rear sub-lens group and the image side lens surface of a lens component disposed to the most image side in the rear sub-lens group.

In a zoom lens system seen from another point of view according to the present application, with disposing the front sub-lens group having the construction described above into the second lens group, it becomes possible to suppress generation of spherical aberration. In a zoom lens system seen from another point of view according to the present application, with disposing the rear sub-lens group having the construction described above into the second lens group, it becomes possible to mitigate generation of curvature of field. Incidentally, a lens component means a single lens or a cemented lens constructed by cementing two lenses or more.

Conditional expression (6) defines an appropriate range of the ratio of the total lengths of the front sub-lens group to that of the rear sub-lens group. In a zoom lens system seen from another point of view according to the present application, with satisfying conditional expression (6), it becomes possible to excellently correct curvature of field, coma and spherical aberration and to prevent the zoom lens system from getting larger.

When the value Σ2a/Σ2b is equal to or exceeds the upper limit of conditional expression (6), the value of Σ2a becomes large. Although spherical aberration generated in the front sub-lens group becomes small, the total lens length of the front sub-lens group becomes large, and the whole of the zoom lens system becomes large, so that it is undesirable. Moreover, curvature of field and coma generated in the rear sub-lens group cannot be sufficiently suppressed. Moreover, the value of Σ2b becomes small, and although the rear sub-lens group is downsized, curvature of field and coma generated in the rear sub-lens group becomes large. Moreover, spherical aberration generated in the front sub-lens group is overcorrected, so that it is undesirable.

In order to secure the effect of the present application, it is preferable to set the upper limit of conditional expression (6) to 12.00 or less. In order to further secure the effect of the present application, it is most preferable to set the upper limit of conditional expression (6) to 7.00 or less. In order to still further secure the effect of the present application, it is most preferable to set the upper limit of conditional expression (6) to 6.53 or less. In order to still further secure the effect of the present application, it is most preferable to set the upper limit of conditional expression (6) to 6.05 or less. In order to still further secure the effect of the present application, it is most preferable to set the upper limit of conditional expression (6) to 5.58 or less. In order to still further secure the effect of the present application, it is most preferable to set the upper limit of conditional expression (6) to 5.10 or less.

On the other hand, when the value Σ2a/Σ2b is equal to or falls below the lower limit of conditional expression (6), the value of Σ2a becomes small, and although the front sub-lens group becomes small, spherical aberration generated in the front sub-lens group becomes large, so that it is undesirable. Moreover, the rear sub-lens group becomes large, and spherical aberration generated in the front sub-lens group cannot be sufficiently corrected, so that it is undesirable. Furthermore, the value of Σ2b becomes large, and the rear sub-lens group becomes large, so that the whole of the zoom lens system becomes large. Accordingly, it is undesirable. Moreover, spherical aberration generated in the front sub-lens group cannot be sufficiently corrected, so that it is undesirable.

In order to secure the effect of the present application, it is preferable to set the lower limit of conditional expression (6) to 0.66 or more. In order to further secure the effect of the present application, it is greatly preferable to set the lower limit of conditional expression (6) to 1.02 or more. In order to further secure the effect of the present application, it is greatly preferable to set the lower limit of conditional expression (6) to 1.42 or more. In order to further secure the effect of the present application, it is greatly preferable to set the lower limit of conditional expression (6) to 1.82 or more. In order to still further secure the effect of the present application, it is still greatly preferable to set the lower limit of conditional expression (6) to 2.22 or more. In order to still further secure the effect of the present application, it is most preferable to set the lower limit of conditional expression (6) to 2.52 or more.

With this configuration described above, it becomes possible to realize a downsized zoom lens system having excellent optical performance.

In a zoom lens system seen from another point of view according to the present application, the following conditional expression (7) is preferably satisfied:

$$0.10 < |fa/fb| < 2.00 \quad (7)$$

where fa denotes a focal length of the front sub-lens group, and fb denotes a focal length of the rear sub-lens group.

Conditional expression (7) defines an appropriate range of the ratio of the focal length of the front sub-lens group to that of the rear sub-lens group. In a zoom lens system seen from another point of view according to the present application, with satisfying conditional expression (7), coma, curvature of field and spherical aberration generated in the second lens group can be mitigated within the second lens group.

When the value |fa/fb| is equal to or exceeds the upper limit of conditional expression (7), fa becomes large with respect to fb, so that curvature of field and coma generated in the rear sub-lens group cannot be sufficiently corrected. Accordingly it is undesirable. Otherwise, fb becomes small with respect to fa, so that curvature of field and coma generated in rear sub-lens group becomes large. Accordingly, it is undesirable.

In order to secure the effect of the present application, it is preferable to set the upper limit of conditional expression (7) to 1.83 or less. In order to further secure the effect of the present application, it is greatly preferable to set the upper limit of conditional expression (7) to 1.65 or less. In order to further secure the effect of the present application, it is greatly preferable to set the upper limit of conditional expression (7) to 1.48 or less. In order to still further secure the effect of the present application, it is most preferable to set the upper limit of conditional expression (7) to 1.30 or less.

On the other hand, when the value |fa/fb| is equal to or falls below the lower limit of conditional expression (7), fb becomes large with respect to fa, so that spherical aberration generated in the front sub-lens group cannot be sufficiently corrected. Accordingly, it is undesirable. Otherwise, fa becomes small with respect to fb, so that spherical aberration generated in the front sub-lens group becomes large. Accordingly, it is undesirable.

In order to secure the effect of the present application, it is preferable to set the lower limit of conditional expression (7) to 0.12 or more. In order to further secure the effect of the present application, it is greatly preferable to set the lower limit of conditional expression (7) to 0.13 or more. In order to further secure the effect of the present application, it is greatly preferable to set the lower limit of conditional expression (7) to 0.15 or more. In order to still further secure the effect of the present application, it is most preferable to set the lower limit of conditional expression (7) to 0.16 or more.

In a zoom lens system seen from another point of view according to the present application, at least a portion of the plurality of lens components in the front sub-lens group is preferably moved along the optical axis as a focusing lens group, thereby carrying out focusing from an infinitely distant object to a close object. With this configuration, it becomes possible to suppress variation in spherical aberration and curvature of field upon focusing from an infinitely distant object to a close object.

In a zoom lens system seen from another point of view according to the present application, the following conditional expression (3) is preferably satisfied:

$$0.15 < |fw/ff| < 0.45 \quad (3)$$

where fw denotes a focal length of the zoom lens system in the wide-angle end state, and ff denotes a focal length of the focusing lens group.

Conditional expression (3) defines an appropriate range of the ratio of the focal length of the zoom lens system in the wide-angle end state to that of the focusing lens group. However, conditional expression (3) has already been explained above, so that duplicated explanations are omitted.

In a zoom lens system seen from another point of view according to the present application, the following conditional expression (4) is preferably satisfied:

$$0.15 < |f_{f}/w| < 0.60 \quad (4)$$

where ffw denotes an image-plane-moving coefficient of the focusing lens group in the wide-angle end state.

Conditional expression (4) defines an appropriate range of the image-plane-moving coefficient, which is a ratio of a moving amount of the image plane with respect to a moving amount of the focusing lens group, in the wide-angle end state. However, conditional expression (4) has already been explained above, so that duplicated explanations are omitted.

In a zoom lens system seen from another point of view according to the present application, at least a portion of the second lens group is preferably moved as a shift lens group in a direction including a component perpendicular to the optical axis. With this configuration, it becomes possible to correct an image blur (vibration reduction) caused by a camera shake or the like. Moreover, with using at least a portion of the second lens group as a shift lens group as described above, coma generated in the shift lens group can be corrected by the other lens elements in the second lens group, so that variation in coma upon moving the shift lens group in a direction including a component perpendicular to the optical axis (upon shifting) can be suppressed.

In a zoom lens system seen from another point of view according to the present application, the following conditional expression (5) is preferably satisfied:

$$-3.70 < ff/fs < 3.10 \quad (5)$$

where ff denotes a focal length of the focusing lens group, and fs denotes a focal length of the shift lens group.

Conditional expression (5) defines an appropriate range of the ratio of the focal length of the focusing lens group to that of the shift lens group. However, conditional expression (5) has already been explained above, so that duplicated explanations are omitted.

In a zoom lens system seen from another point of view according to the present application, each of the plurality of lens components in the front sub-lens group preferably has positive refractive power. With this configuration, it becomes possible to suppress spherical aberration, coma and curvature of field generated in each of the plurality of lens components.

In a zoom lens system seen from another point of view according to the present application, the first lens group preferably has negative refractive power. With this configuration, the total lens length of the zoom lens system can be shortened, so that it is desirable. Moreover, various aberrations such as spherical aberration can be excellently corrected, so that it is desirable.

In a zoom lens system seen from another point of view according to the present application, the second lens group preferably has positive refractive power. With this configuration, spherical aberration and curvature of field can be excellently corrected, so that it is preferable.

In a zoom lens system seen from another point of view according to the present application, it is preferable that the first lens group has negative refractive power, the front sub-lens group has positive refractive power, and the rear sub-lens group has negative refractive power. With this configuration, aberrations generated in the first lens group and the rear sub-lens group can be suppressed.

An optical apparatus seen from another point of view according to the present application is equipped with the zoom lens system described above. With this configuration, it becomes possible to realize a downsized optical apparatus having excellent optical performance.

A method for manufacturing the zoom lens system seen from another point of view according to the present application is a method for manufacturing a zoom lens system including, in order from an object side, a first lens group and a second lens group. Disposing the second lens group such that the second lens group consists of, in order from the object side, a front sub-lens group and a rear sub-lens group, the front sub-lens group consists of a plurality of lens components each having the same sign of refractive power, the rear sub-lens group includes a lens component that is disposed to the most object side and has a different sign of refractive power from the sign of refractive power of the plurality of lens components in the front sub-lens group. Disposing the front sub-lens group and the rear sub-lens group with satisfying the following conditional expression (6):

$$0.20 < \Sigma 2a/\Sigma 2b < 18.00 \quad (6)$$

where $\Sigma 2a$ denotes a distance along an optical axis between the object side lens surface of a lens component disposed to the most object side of the front sub-lens group and the image side lens surface of a lens component disposed to the most image side of the front sub-lens group, and $\Sigma 2b$ denotes a distance along the optical axis between the object side lens surface of a lens component disposed to the most object side of the rear sub-lens group and a image side lens surface of a lens component disposed to the most image side of the rear sub-lens group. Disposing the first lens group and the second lens group variably so that a distance between the first lens group and the second lens group may be varied upon zooming from the wide-angle end state to the telephoto end state.

With the method for manufacturing the zoom lens system seen from another point of view according to the present application, it becomes possible to manufacture a downsized zoom lens system having excellent optical performance.

Then, a zoom lens system according to each numerical example of the present application is explained below with reference to accompanying drawings.

EXAMPLE 1

FIG. 1 is a sectional view showing a lens configuration of a zoom lens system according to Example 1 of the present application.

The zoom lens system according to Example 1 is composed of, in order from an object side, a first lens group G1 having negative refractive power and a second lens group G2 having positive refractive power.

The first lens group G1 is composed of, in order from the object side, a negative meniscus lens L11 having a convex surface facing the object side, a negative meniscus lens L12 having a convex surface facing the object side, a positive meniscus lens L13 having a convex surface facing the object side, and a positive meniscus lens L14 having a convex surface facing the object side. Incidentally, the negative meniscus lens L11 is an aspherical lens in which an aspherical surface is formed on the image side lens surface.

The second lens group G2 is composed of, in order from the object side, a front sub-lens group G2a having positive refractive power, and a rear sub-lens group G2b having negative refractive power.

The front sub-lens group G2a is composed of, in order from the object side, a cemented positive lens constructed by a negative meniscus lens L21 having a convex surface facing the object side cemented with a positive meniscus lens L22 having a convex surface facing the object side, a positive meniscus lens L23 having a convex surface facing the object side, an aperture stop S, and a cemented positive lens constructed by a double convex positive lens L24 cemented with a negative meniscus lens L25 having a concave surface facing the object side. Incidentally, the negative meniscus lens L21 is an aspherical lens in which an aspherical surface is formed on the object side lens surface. The positive meniscus lens L23 is an aspherical lens in which an aspherical surface is formed on the object side lens surface.

The rear sub-lens group G2b is composed of only a cemented negative lens constructed by, in order from the object side, a double concave negative lens L26 cemented with a double convex positive lens L27. Incidentally, the double convex positive lens L27 is an aspherical lens in which an aspherical surface is formed on the image side lens surface.

In the zoom lens system according to Example 1, upon zooming from the wide-angle end state to the telephoto end state, the first lens group G1 and the second lens group G2 are moved along the optical axis such that a distance between the first lens group G1 and the second lens group G2 decreases.

In the zoom lens system according to Example 1, the cemented positive lens constructed by the negative meniscus lens L21 cemented with the positive meniscus lens L22 in the front sub-lens group G2a is moved as the focusing lens group to the image side, thereby carrying out focusing from an infinitely distant object to a close object.

In the zoom lens system according to Example 1, the cemented positive lens constructed by the positive lens L24 cemented with the negative meniscus lens L25 in the front sub-lens group G2a is moved as the shift lens group in a direction including a component perpendicular to the optical axis, thereby correcting an image blur.

Various values associated with the zoom lens system according to Example 1 are listed in Table 1. In (Specifications), W denotes a wide-angle end state, M denotes an intermediate focal length state, T denotes a telephoto end state, f denotes a focal length of the zoom lens system, FNO denotes an f-number, 2ω denotes an angle of view (unit: degree), Y denotes an image height, TL denotes a total lens length, and BF denotes a back focal length.

In (Lens Data), "OP" denotes an object plane, "I" denotes an image plane, the left most column "i" shows the lens surface number counted in order from the object side, the second column "r" shows a radius of curvature of the lens surface, the third column "d" shows a distance to the next optical surface, the fourth column "nd" shows a refractive index at d-line (wavelength λ=587.6 nm), and the fifth column "vd" shows an Abbe number at d-line (wavelength λ=587.6 nm). In (Lens Data), S denotes an aperture stop, FS1 denotes a first flare stopper, FS2 denotes a second flare stopper. In the fifth column "nd", refractive index of the air nd=1.000000 is omitted. In the second column "r", r=∞ indicates a plane surface. In third column "d", Bf denotes a back focal length. In (Aspherical Surface Date), an aspherical surface is expressed by the following expression:

$$S(y)=(y^2/r)/(1+(1-\kappa(y^2/r^2))^{1/2}) +C4xy^4+C6xy^6+C8xy^8+C10xy^{10}$$

where "y" denotes a vertical height from the optical axis, S(y) denotes a sag amount which is a distance along the optical axis from the tangent surface at the vertex of the aspherical surface to the aspherical surface at the vertical height y from the optical axis, r denotes a radius of curvature of a reference sphere (paraxial radius of curvature), κ denotes a conical coefficient, and Cn denotes an aspherical coefficient of n-th order. In (Aspherical Surface Data), "E-n" denotes "×10$^{-n}$", in which "n" is an integer, and for example "1.234E-05" denotes "1.234×10$^{-5}$". Each aspherical surface is expressed in (Lens Data) by attaching "*" to the left side of the surface number and a paraxial radius of curvature is shown in the column "r".

In (Lens Group Data), a starting surface number "ST" and a focal length of each lens group are shown.

In (Values for Conditional Expressions), values for respective conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples.

TABLE 1

(Specifications)
Zoom Ratio = 2.825

|  | W | M | T |
|---|---|---|---|
| f = | 10.3 | 17.3 | 29.1 |
| FNO = | 3.57 | 4.27 | 5.80 |
| 2ω = | 79.56 | 51.30 | 31.64 |
| Y = | 8.25 | 8.25 | 8.25 |
| TL = | 74.59 | 69.93 | 76.27 |
| BF = | 19.74 | 28.12 | 42.24 |

(Lens Data)

| i | r | d | nd | vd |
|---|---|---|---|---|
| OP | ∞ |  |  |  |
| 1 | 18.4021 | 1.3000 | 1.851348 | 40.10 |
| *2 | 9.4660 | 5.1881 |  |  |
| 3 | 106.6621 | 1.0000 | 1.882997 | 40.76 |
| 4 | 12.4920 | 1.7530 |  |  |
| 5 | 18.3528 | 1.7749 | 1.846660 | 23.78 |
| 6 | 28.9480 | 0.6457 |  |  |
| 7 | 17.1399 | 2.0751 | 1.808090 | 22.79 |
| 8 | 32.7787 | (d8) |  |  |
| *9 | 15.0062 | 0.8000 | 1.834410 | 37.28 |
| 10 | 9.9310 | 1.7000 | 1.741000 | 52.67 |
| 11 | 36.5917 | (d11) |  |  |
| *12 | 20.2806 | 1.2433 | 1.589130 | 61.25 |
| 13 | 519.9944 | 0.8000 |  |  |
| 14 | ∞ | 1.0000 | Aperture Stop S |  |
| 15 | 33.1718 | 2.0873 | 1.617200 | 54.01 |
| 16 | −13.7000 | 1.0000 | 1.740769 | 27.78 |
| 17 | −47.2996 | 1.8086 |  |  |
| 18 | −12.0144 | 0.8000 | 1.834000 | 37.16 |
| 19 | 10.7146 | 3.3683 | 1.730766 | 40.50 |
| *20 | −14.3627 | BF |  |  |
| I | ∞ |  |  |  |

(Aspherical Surface Data)

Surface Number: 2

K = −0.8688
C4 = 2.24260E−04
C6 = −1.18580E−07
C8 = 2.08650E−09
C10 = 0.00000E+00

Surface Number: 9

K = 1.5382
C4 = −4.34140E−05
C6 = 1.85070E−08
C8 = −3.18730E−08
C10 = 9.22250E−10

Surface Number: 12

K = 1.0000
C4 = 6.95110E−05

TABLE 1-continued

C6 = 8.09320E−07
C8 = −2.75250E−09
C10 = 0.00000E+00
Surface Number: 20

K = 1.0000
C4 = 7.53770E−05
C6 = 6.63130E−07
C8 = 0.00000E+00
C10 = 0.00000E+00

(Variable Distances)

|  | W | M | T |
|---|---|---|---|
| <upon focusing on an infinitely distant object> | | | |
| f = | 10.30000 | 17.30000 | 29.10000 |
| d8 = | 22.27046 | 9.23047 | 1.45000 |
| d11 = | 4.2370 | 4.2370 | 4.2370 |
| BF = | 19.73960 | 28.11827 | 42.24230 |
| <upon focusing on a close object, shooting magnification = −0.01> | | | |
| d0 = | 1008.7799 | 1711.7323 | 2893.5651 |
| f = | 10.30000 | 17.30000 | 29.10000 |
| d8 = | 22.56436 | 9.39160 | 1.55387 |
| d11 = | 3.94313 | 4.07590 | 4.13316 |
| BF = | 19.73960 | 28.11827 | 42.24230 |

(Lens Group Data)

| Group | ST | Focal Length |
|---|---|---|
| 1 | 1 | −16.653 |
| 2 | 9 | 19.933 |
| 2a | 9 | 15.032 |
| 2b | 18 | −52.447 |

(Values for Conditional Expressions)

Figure 2B:
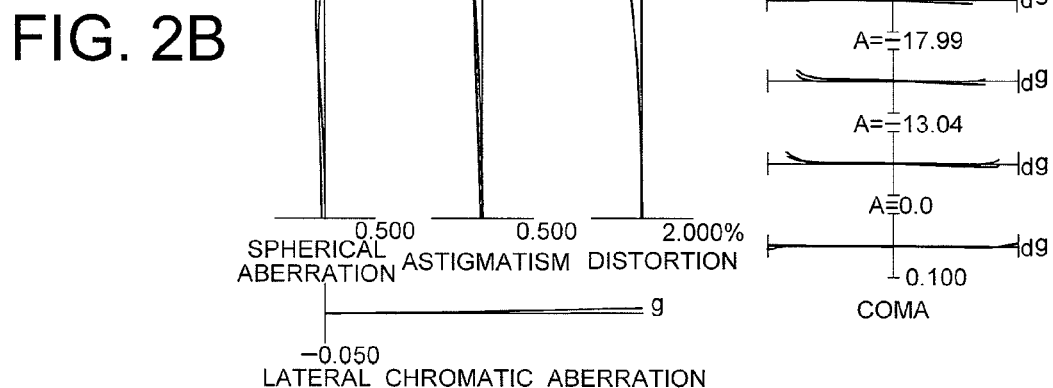
Figure 2C:
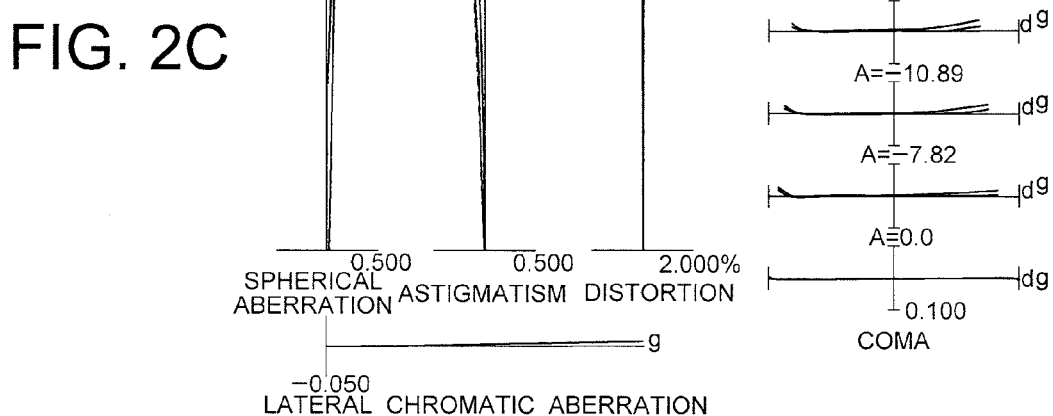

(1) $(-f1)/fw = 1.617$
(2) $(-f1)/ft = 0.572$
(3) $|fw/ff| = 0.284$
(4) $|f_{fw}| = 0.351$
(5) $ff/fs = 0.906$
(6) $\Sigma 2a/\Sigma 2b = 3.087$
(7) $|fa/fb| = 0.287$ FIGS. 2A, 2B, and 2C are graphs showing various aberrations of the zoom lens system according to Example 1 focusing on an infinitely distant object, in which FIG. 2A is in a wide-angle end state, FIG. 2B is in an intermediate focal length state, and FIG. 2C is in a telephoto end state.

FIGS. 3A, 3B, and 3C are graphs showing various aberrations of the zoom lens system according to Example 1 focusing on a close object (shooting magnification=−0.01), in which FIG. 3A is in the wide-angle end state, FIG. 3B is in the intermediate focal length state, and FIG. 3C is in the telephoto end state.

Figure 4A:
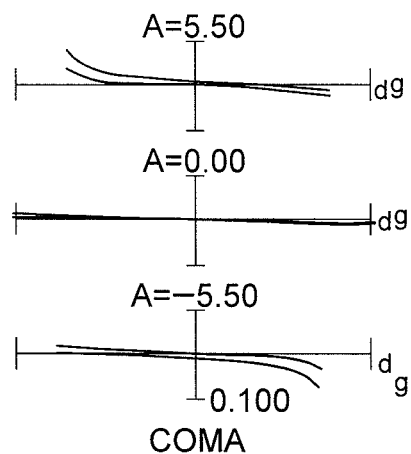
Figure 4B:
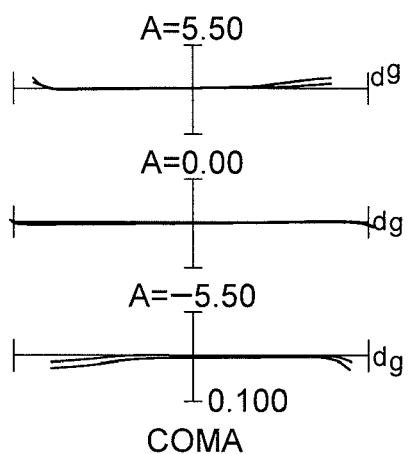

FIGS. 4A, and 4B are graphs showing coma of the zoom lens system according to Example 1 upon shifting a shift lens group (±0.1 mm) focusing on an infinitely distant object, in which FIG. 4A is in the wide-angle end state, and FIG. 4B is in the telephoto end state.

In respective graphs in FIGS. 2A through 4B, FNO denotes an f-number, NA denotes a numerical aperture, A denotes a half angle of view, H0 denotes an object height, d denotes d-line (wavelength λ=587.6 nm), and g denotes g-line (wavelength λ=435.8 nm). In graphs showing astigmatism, a solid line indicates a sagittal image plane, and a broken line indicates a meridional image plane. The above-described explanations regarding various aberration graphs are the same as the other Examples.

As is apparent from the respective graphs, the zoom lens system according to Example 1 shows superb optical performance as a result of good corrections to various aberrations in each focal length state from the wide-angle end state through the telephoto end state, even upon shifting the shift lens group.

EXAMPLE 2

Figure 5:
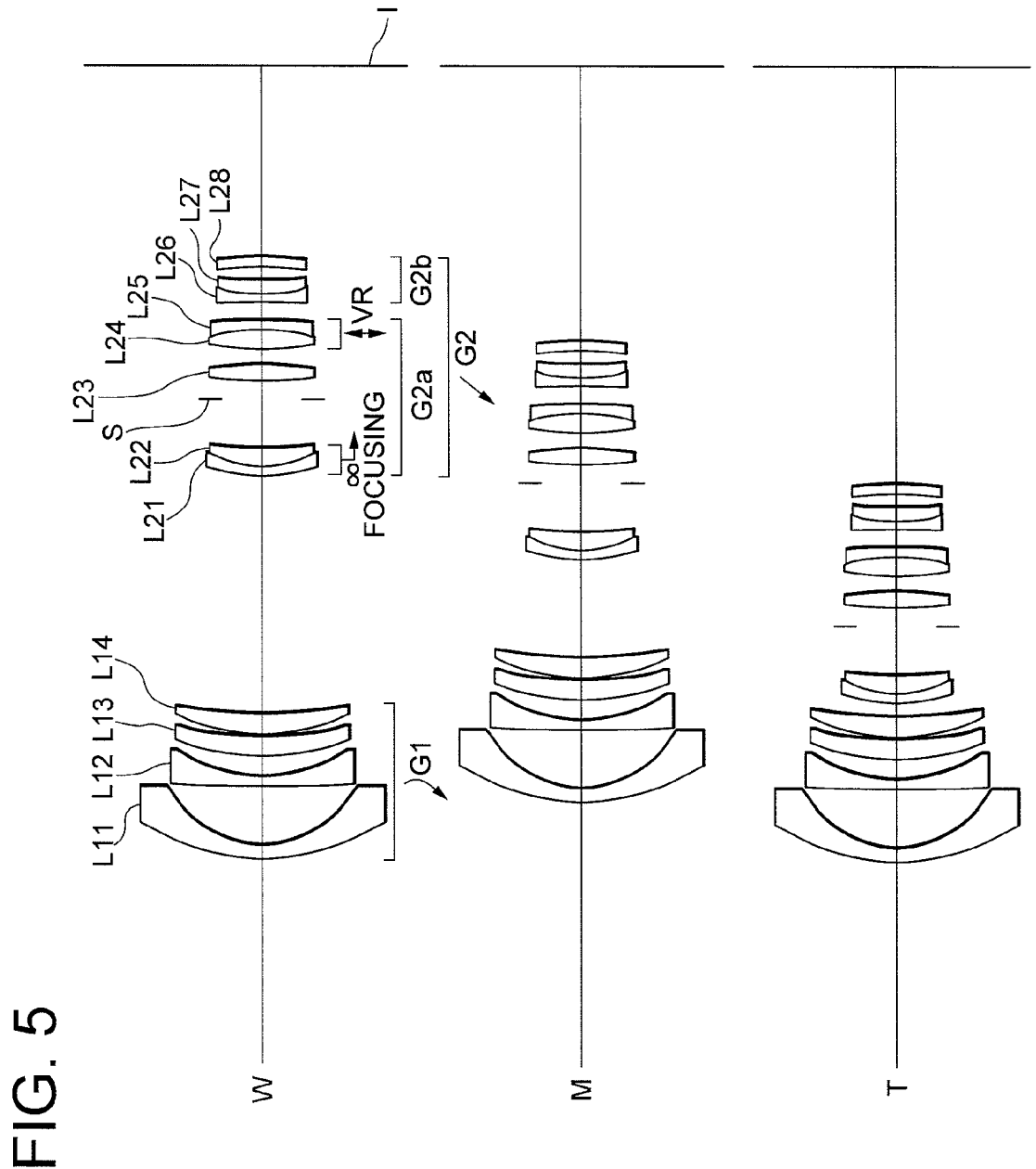
FIG. 5 is a sectional view showing a lens configuration of a zoom lens system according to Example 2 of the present application.

FIG. 5 is a sectional view showing a lens configuration of a zoom lens system according to Example 2 of the present application.

The zoom lens system according to Example 2 is composed of, in order from an object side, a first lens group G1 having negative refractive power, and a second lens group G2 having positive refractive power.

The first lens group G1 is composed of, in order from the object side, a negative meniscus lens L11 having a convex surface facing the object side, a negative meniscus lens L12 having a convex surface facing the object side, a positive meniscus lens L13 having a convex surface facing the object side, and a positive meniscus lens L14 having a convex surface facing the object side. Incidentally, the negative meniscus lens L11 is an aspherical lens in which an aspherical surface is formed on the image side lens surface.

The second lens group G2 is composed of, in order from the object side, a front sub-lens group G2a having positive refractive power and a rear sub-lens group G2b having negative refractive power.

The front sub-lens group G2a is composed of, in order from the object side, a cemented positive lens constructed by a negative meniscus lens L21 having a convex surface facing the object side cemented with a positive meniscus lens L22 having a convex surface facing the object side, an aperture stop S, a double convex positive lens L23, and a cemented positive lens constructed by a double convex positive lens L24 cemented with a negative meniscus lens L25 having a concave surface facing the object side. Incidentally, the negative meniscus lens L21 is an aspherical lens in which an aspherical surface is formed on the object side lens surface.

The rear sub-lens group G2b is composed of, in order from the object side, a cemented negative lens constructed by a double concave negative lens L26 cemented with a positive meniscus lens L27 having a convex surface facing the object side, and a positive meniscus lens L28 having a concave surface facing the object side. Incidentally, the positive meniscus lens L28 is an aspherical lens in which an aspherical surface is formed on the image side lens surface.

In the zoom lens system according to Example 2, upon zooming from a wide-angle end state to a telephoto end state, the first lens group G1 and the second lens group G2 move along the optical axis such that a distance between the first lens group G1 and the second lens group G2 decreases.

In the zoom lens system according to Example 2, the cemented positive lens constructed by the negative meniscus lens L21 cemented with the positive meniscus lens L22 in the front sub-lens group G2a is moved to the image side as a focusing lens group, thereby carrying out focusing from an infinitely distant object to a close object.

In the zoom lens system according to Example 2, the cemented positive lens constructed by the positive lens L24 cemented with the negative meniscus lens L25 in the front sub-lens group G2a is moved as a shift lens group in a direction including a component perpendicular to the optical axis, thereby correcting an image blur.

Various values associated with the zoom lens system according to Example 2 are listed in Table 2.

TABLE 2

(Specifications)
Zoom Ratio = 2.825

|  | W | M | T |
|---|---|---|---|
| f = | 10.3 | 17.3 | 29.1 |
| FNO = | 3.59 | 4.33 | 5.80 |
| 2ω = | 79.82 | 51.28 | 31.62 |
| Y = | 8.22 | 8.22 | 8.22 |
| TL = | 77.52 | 72.08 | 77.92 |
| BF = | 18.51 | 26.86 | 40.93 |

(Lens Data)

| i | r | d | nd | νd |
|---|---|---|---|---|
| OP | ∞ |  |  |  |
| 1 | 21.7269 | 1.3000 | 1.851348 | 40.10 |
| *2 | 9.4719 | 5.7500 |  |  |
| 3 | 111.4840 | 1.0000 | 1.882997 | 40.76 |
| 4 | 14.9963 | 1.9500 |  |  |
| 5 | 22.3090 | 2.0000 | 1.846660 | 23.78 |
| 6 | 33.1016 | 0.2000 |  |  |
| 7 | 18.7069 | 2.0000 | 1.808090 | 22.79 |
| 8 | 43.2782 | (d8) |  |  |
| *9 | 15.0616 | 0.8000 | 1.834410 | 37.28 |
| 10 | 9.5077 | 2.0000 | 1.729157 | 54.66 |
| 11 | 32.9673 | (d11) |  |  |
| 12 | ∞ | 1.8500 | Aperture Stop S | |
| 13 | 34.6096 | 1.5500 | 1.487490 | 70.45 |
| 14 | −34.6096 | 1.5000 |  |  |
| 15 | 27.5396 | 1.8500 | 1.617200 | 54.01 |
| 16 | −19.7960 | 1.0000 | 1.755199 | 27.51 |
| 17 | −77.6432 | 1.8000 |  |  |
| 18 | −73.1879 | 0.8000 | 1.806100 | 40.94 |
| 19 | 14.1510 | 1.3000 | 1.677900 | 55.40 |
| 20 | 36.2665 | 1.1500 |  |  |
| 21 | −64.5797 | 1.1500 | 1.730770 | 40.51 |
| *22 | −30.4612 | BF |  |  |
| I | ∞ |  |  |  |

(Aspherical Surface Data)

Surface Number: 2

K = 0.4886
C4 = 1.63540E−05
C6 = 4.58660E−07
C8 = −4.87000E−09
C10 = 3.86610E−11

Surface Number: 9

K = 1.0000
C4 = −2.12610E−05
C6 = −1.64030E−07
C8 = 0.00000E+00
C10 = 0.00000E+00

Surface Number: 22

K = 4.0626
C4 = 8.23580E−05
C6 = 4.98300E−07
C8 = −3.25370E−09
C10 = 0.00000E+00

(Variable Distances)

|  | W | M | T |
|---|---|---|---|
| <upon focusing on an infinitely distant object> | | | |
| f = | 10.30001 | 17.29999 | 29.09994 |
| d8 = | 23.30172 | 9.51054 | 1.28187 |
| d11 = | 4.75728 | 4.75728 | 4.75728 |
| BF = | 18.51046 | 26.85868 | 40.93132 |
| <upon focusing on a close object, shooting magnification = −0.01> | | | |
| d0 = | 1010.1167 | 1712.4939 | 2894.2034 |
| f = | 10.30001 | 17.29999 | 29.09994 |
| d8 = | 23.59826 | 9.68431 | 1.39657 |
| d11 = | 4.46074 | 4.58351 | 4.64257 |
| BF = | 18.51046 | 26.85868 | 40.93135 |

(Lens Group Data)

| Group | ST | Focal Length |
|---|---|---|
| 1 | 1 | −17.157 |
| 2 | 9 | 20.462 |
| 2a | 9 | 16.311 |
| 2b | 18 | −40.208 |

(Values for Conditional Expressions)

(1) (−f1)/fw = 1.666
(2) (−f1)/ft = 0.590
(3) |fw/ff| = 0.249
(4) |fγw| = 0.348
(5) ff/fs = 1.04
(6) Σ2a/Σ2b = 3.479
(7) |fa/fb| = 0.406

Figure 6A:
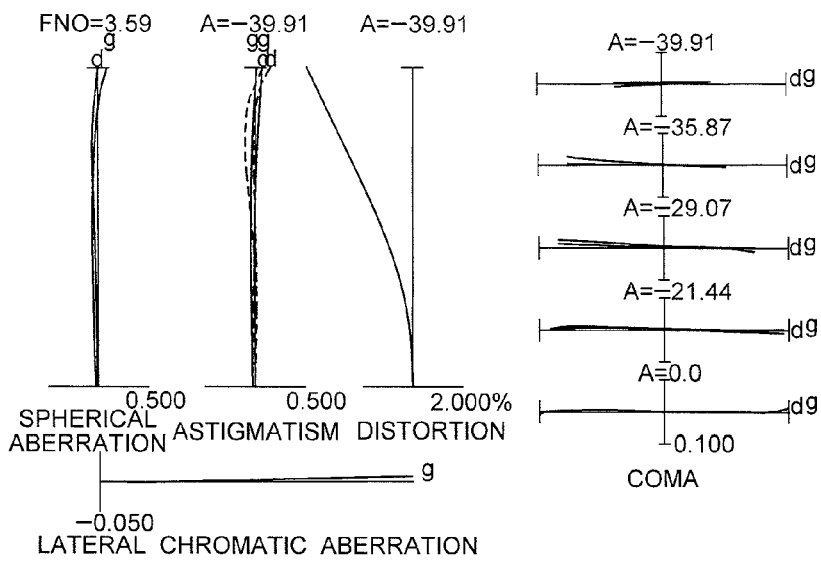
Figure 6B:
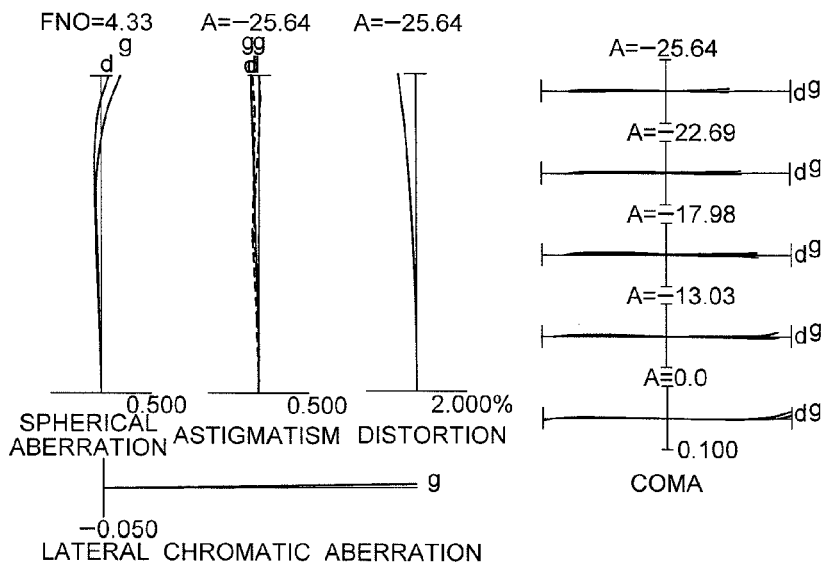
Figure 6C:
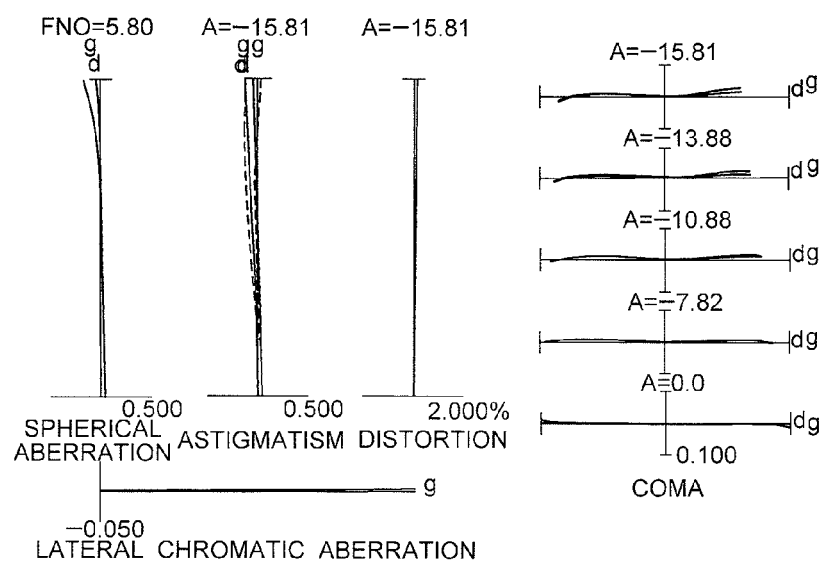

FIGS. 6A, 6B, and 6C are graphs showing various aberrations of the zoom lens system according to Example 2 focusing on an infinitely distant object, in which FIG. 6A is in a wide-angle end state, FIG. 6B is in an intermediate focal length state, and FIG. 6C is in a telephoto end state.

Figure 7A:
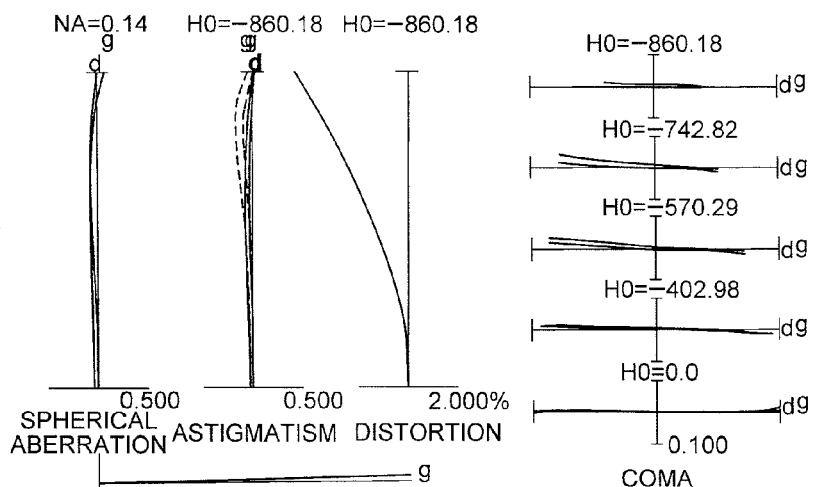
Figure 7B:
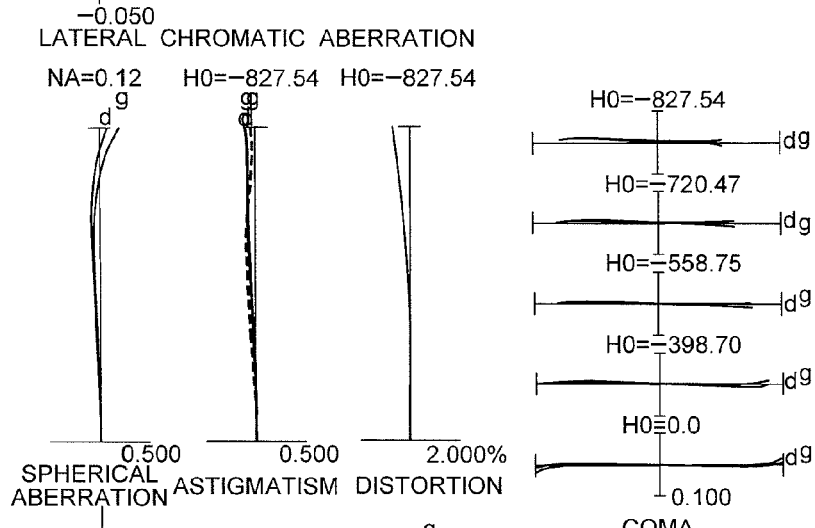
Figure 7C:
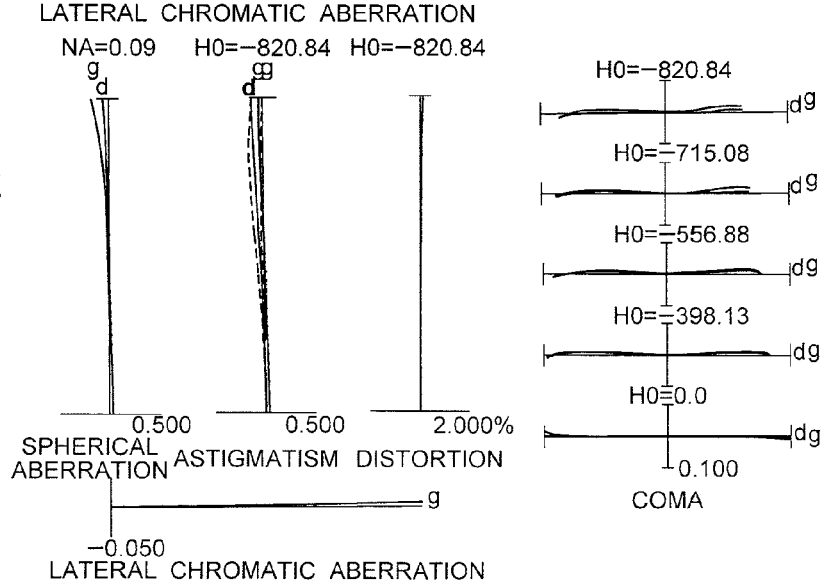

FIGS. 7A, 7B, and 7C are graphs showing various aberrations of the zoom lens system according to Example 2 focusing on a close object (shooting magnification=−0.01), in which FIG. 7A is in the wide-angle end state, FIG. 7B is in the intermediate focal length state, and FIG. 7C is in the telephoto end state.

Figure 8A:
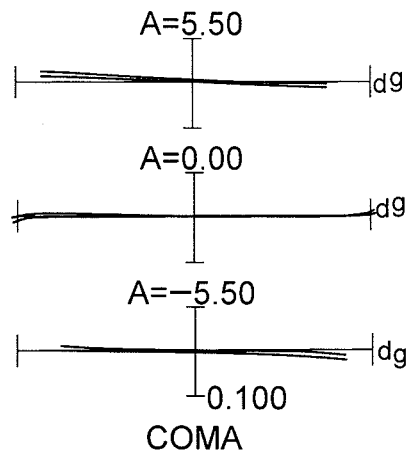
Figure 8B:
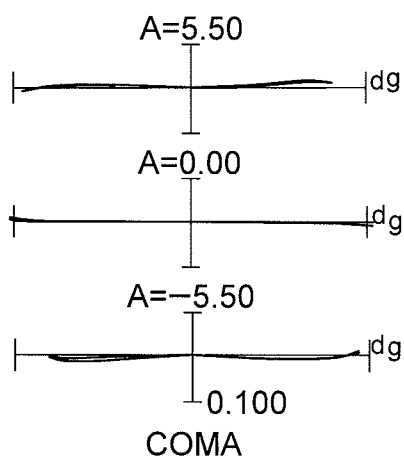

FIGS. 8A, and 8B are graphs showing coma of the zoom lens system according to Example 2 upon shifting a shift lens group (±0.1 mm) focusing on an infinitely distant object, in which FIG. 8A is in the wide-angle end state, and FIG. 8B is in the telephoto end state.

As is apparent from the respective graphs, the zoom lens system according to Example 2 shows superb optical performance as a result of good corrections to various aberrations in each focal length state from the wide-angle end state through the telephoto end state, even upon shifting the shift lens group.

EXAMPLE 3

Figure 9:
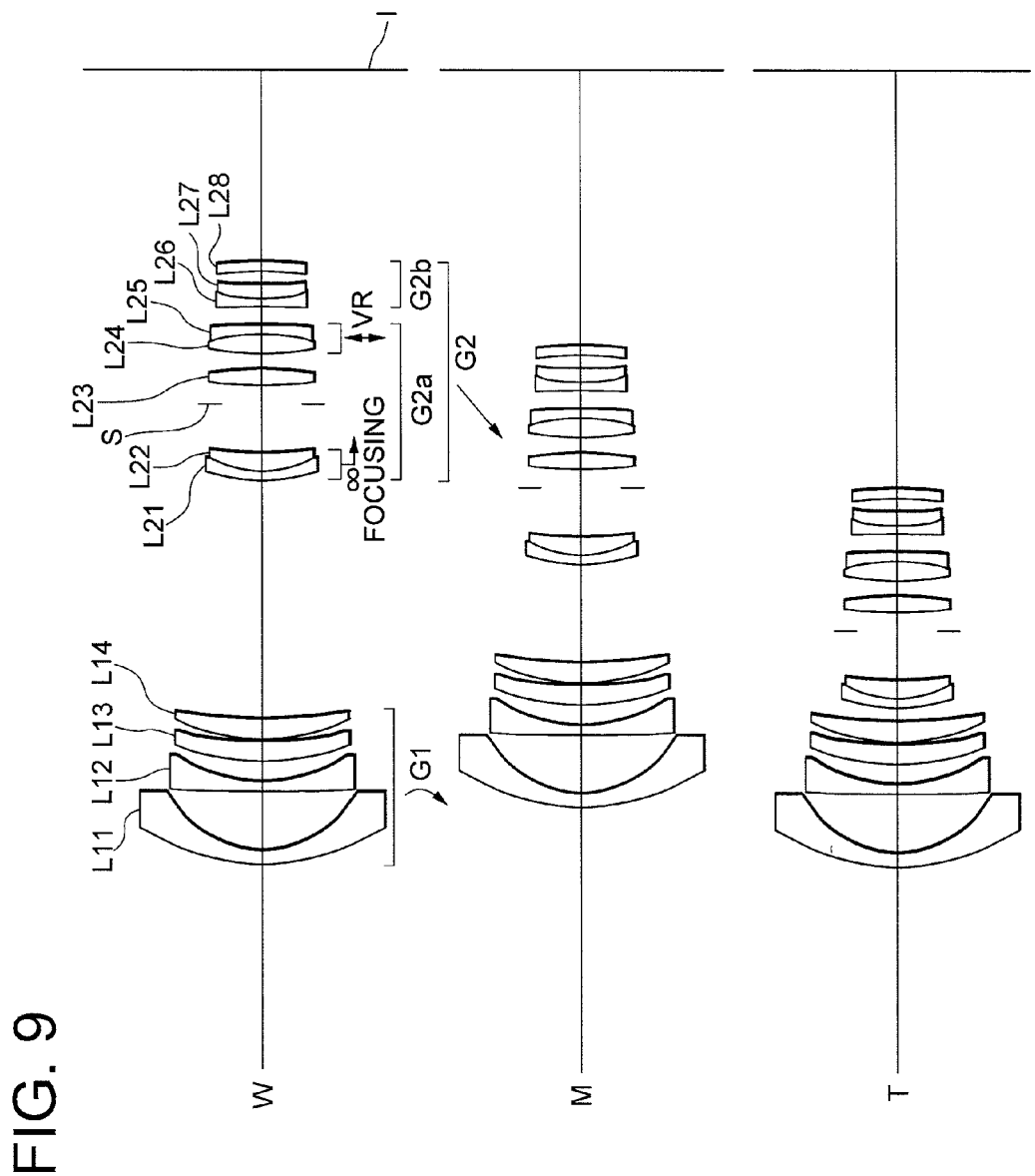
FIG. 9 is a sectional view showing a lens configuration of a zoom lens system according to Example 3 of the present application.

FIG. 9 is a sectional view showing a lens configuration of a zoom lens system according to Example 3 of the present application.

The zoom lens system according to Example 3 is composed of, in order from an object side, a first lens group G1 having negative refractive power, and a second lens group G2 having positive refractive power.

The first lens group G1 is composed of, in order from the object side, a negative meniscus lens L11 having a convex surface facing the object side, a negative meniscus lens L12 having a convex surface facing the object side, a positive meniscus lens L13 having a convex surface facing the object side, and a positive meniscus lens L14 having a convex surface facing the object side. Incidentally, the negative meniscus lens L11 is an aspherical lens in which an aspherical surface is formed on the image side lens surface.

The second lens group G2 is composed of, in order from the object side, a front sub-lens group G2a having positive refractive power and a rear sub-lens group G2b having negative refractive power.

The front sub-lens group G2a is composed of, in order from the object side, a cemented positive lens constructed by a negative meniscus lens L21 having a convex surface facing the object side cemented with a positive meniscus lens L22 having a convex surface facing the object side, an aperture stop S, a double convex positive lens L23, and a cemented positive lens constructed by a double convex positive lens L24 cemented with a negative meniscus lens L25 having a concave surface facing the object side. Incidentally, the negative meniscus lens L21 is an aspherical lens in which an aspherical surface is formed on the object side lens surface.

The rear sub-lens group G2b is composed of, in order from the object side, a cemented negative lens constructed by a double concave negative lens L26 cemented with a positive meniscus lens L27 having a convex surface facing the object side, and a positive meniscus lens L28 having a concave surface facing the object side. Incidentally, the positive meniscus lens L28 is an aspherical lens in which an aspherical surface is formed on the image side lens surface.

In the zoom lens system according to Example 3, upon zooming from a wide-angle end state to a telephoto end state, the first lens group G1 and the second lens group G2 move along the optical axis such that a distance between the first lens group G1 and the second lens group G2 decreases.

In the zoom lens system according to Example 3, the cemented positive lens constructed by the negative meniscus lens L21 cemented with the positive meniscus lens L22 in the front sub-lens group G2a is moved to the image side as a focusing lens group, thereby carrying out focusing from an infinitely distant object to a close object.

In the zoom lens system according to Example 3, the cemented positive lens constructed by the positive lens L24 cemented with the negative meniscus lens L25 in the front sub-lens group G2a is moved as a shift lens group in a direction including a component perpendicular to the optical axis, thereby correcting an image blur.

Various values associated with the zoom lens system according to Example 3 are listed in Table 3.

TABLE 3

(Specifications)
Zoom Ratio = 2.825

|   | W | M | T |
|---|---|---|---|
| f = | 10.3 | 17.3 | 29.1 |
| FNO = | 3.59 | 4.33 | 5.80 |
| 2ω = | 79.76 | 51.26 | 31.60 |
| Y = | 8.22 | 8.22 | 8.22 |
| TL = | 77.50 | 72.05 | 77.87 |
| BF = | 18.37 | 26.70 | 40.75 |

(Lens Data)

| i | r | d | nd | νd |
|---|---|---|---|---|
| OP | ∞ | | | |
| 1 | 21.7269 | 1.3000 | 1.851348 | 40.10 |
| *2 | 9.4719 | 5.7500 | | |
| 3 | 111.4840 | 1.0000 | 1.882997 | 40.76 |
| 4 | 14.9963 | 1.9500 | | |
| 5 | 22.2590 | 1.9000 | 1.846660 | 23.78 |
| 6 | 33.3223 | 0.2000 | | |
| 7 | 18.7069 | 2.1000 | 1.808090 | 22.79 |
| 8 | 42.8001 | (d8) | | |
| *9 | 15.0616 | 0.8000 | 1.834410 | 37.28 |
| 10 | 9.5077 | 2.0000 | 1.729157 | 54.66 |
| 11 | 32.9673 | (d11) | | |
| 12 | ∞ | 1.8500 | Aperture Stop S | |
| 13 | 34.6096 | 1.5500 | 1.487490 | 70.45 |
| 14 | −34.6096 | 1.4500 | | |
| 15 | 27.0404 | 2.0000 | 1.583130 | 59.38 |
| 16 | −17.0002 | 1.0000 | 1.688930 | 31.06 |
| 17 | −70.6449 | 1.8000 | | |
| 18 | −73.1879 | 0.8000 | 1.806100 | 40.94 |
| 19 | 14.1510 | 1.3000 | 1.677900 | 55.40 |
| 20 | 36.2665 | 1.1500 | | |
| 21 | −64.5797 | 1.1500 | 1.730770 | 40.51 |
| *22 | −30.4612 | BF | | |
| I | ∞ | | | |

(Aspherical Surface Data)

Surface Number: 2

K = 0.4886
C4 = 1.63540E−05
C6 = 4.58660E−07
C8 = −4.89000E−09
C10 = 3.86610E−11

Surface Number: 9

K = 1.0000
C4 = −2.17000E−05
C6 = −1.55000E−07
C8 = 0.00000E+00
C10 = 0.00000E+00

Surface Number: 22

K = 4.0626
C4 = 8.23580E−05
C6 = 4.98300E−07
C8 = −3.25370E−09
C10 = 0.00000E+00

(Variable Distances)

|   | W | M | T |
|---|---|---|---|

<upon focusing on an infinitely distant object>

| f = | 10.29998 | 17.29997 | 29.09996 |
|---|---|---|---|
| d8 = | 23.32950 | 9.54740 | 1.32415 |
| d11 = | 4.74745 | 4.74745 | 4.74745 |
| BF = | 18.36848 | 26.70133 | 40.74813 |

<upon focusing on a close object, shooting magnification = −0.01>

| d0 = | 1010.0819 | 1712.5230 | 2894.2416 |
|---|---|---|---|
| f = | 10.29998 | 17.29997 | 29.09996 |
| d8 = | 23.62641 | 9.72135 | 1.43894 |
| d11 = | 4.45054 | 4.57350 | 4.63266 |
| BF = | 18.36848 | 26.70133 | 40.74814 |

(Lens Group Data)

| Group | ST | Focal Length |
|---|---|---|
| 1 | 1 | −17.167 |
| 2 | 9 | 20.436 |
| 2a | 9 | 16.330 |
| 2b | 18 | −40.208 |

(Values for Conditional Expressions)

(1) (−f1)/fw = 1.667
(2) (−f1)/ft = 0.590
(3) |fw/ff| = 0.249
(4) |fγw| = 0.347
(5) ff/fs = 1.031
(6) Σ2a/Σ2b = 3.499
(7) |fa/fb| = 0.406

Figure 10A:
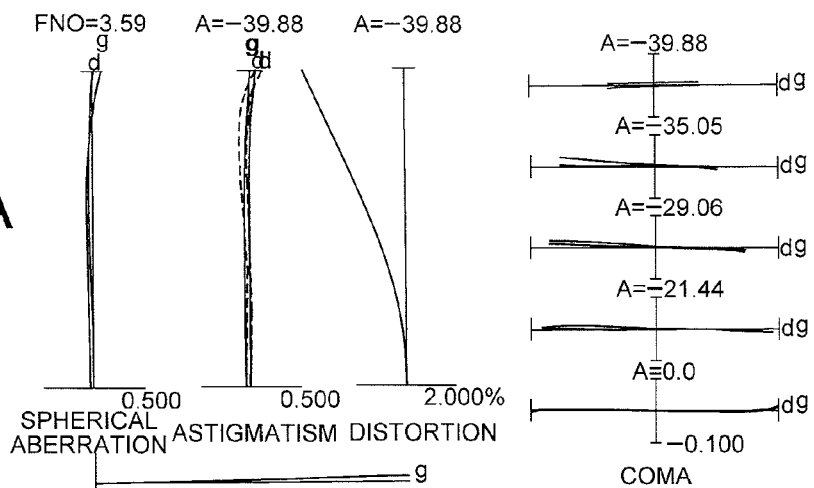
Figure 10B:
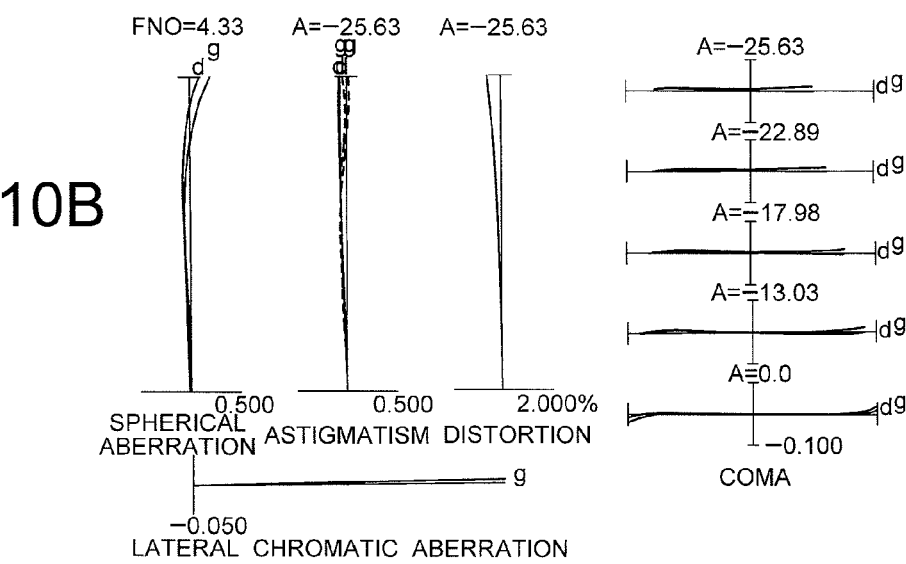
Figure 10C:
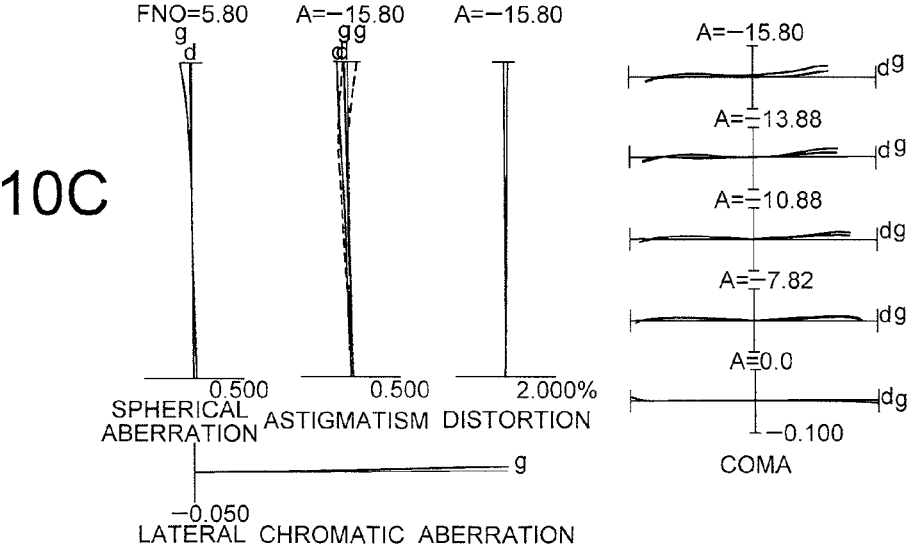

FIGS. 10A, 10B, and 10C are graphs showing various aberrations of the zoom lens system according to Example 3 focusing on an infinitely distant object, in which FIG. 10A is in a wide-angle end state, FIG. 10B is in an intermediate focal length state, and FIG. 10C is in a telephoto end state.

Figure 11A:
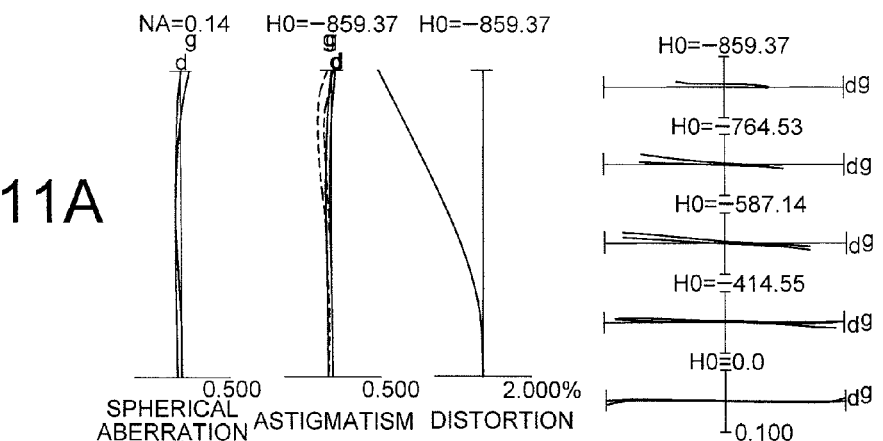
Figure 11B:
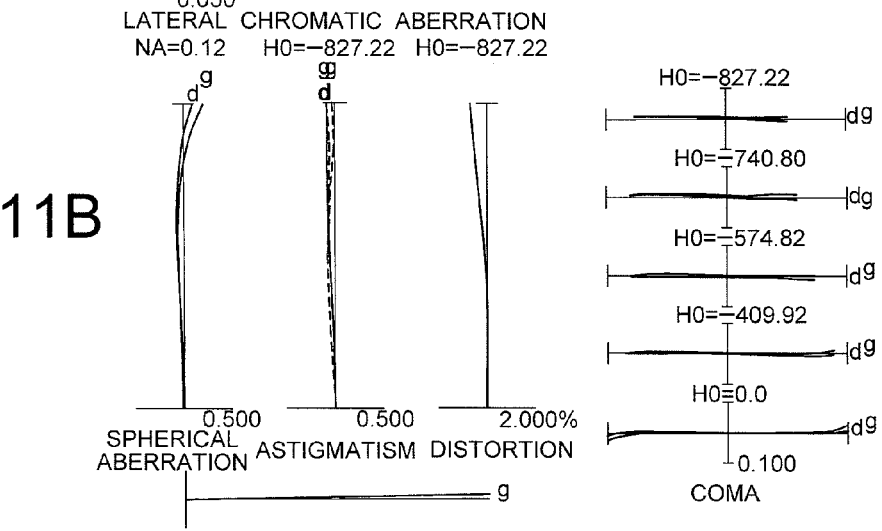
Figure 11C:
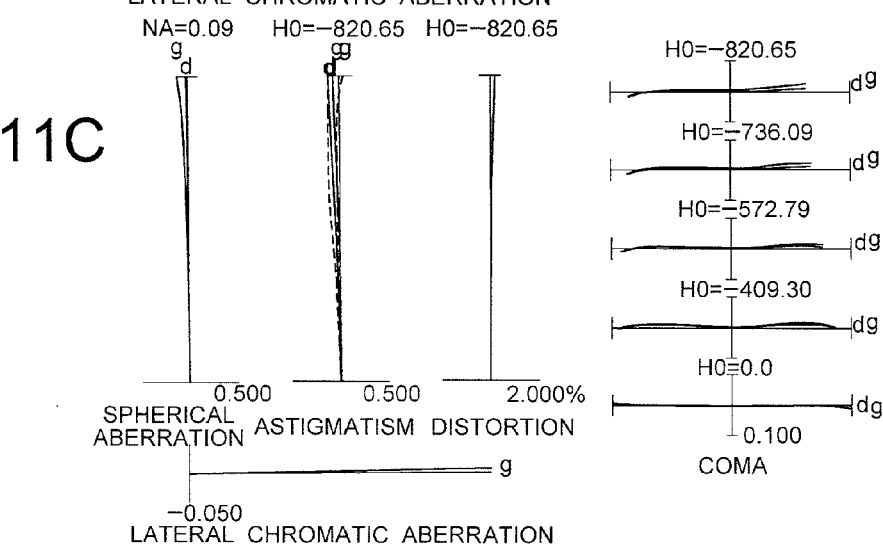

FIGS. 11A, 11B, and 11C are graphs showing various aberrations of the zoom lens system according to Example 3 focusing on a close object (shooting magnification=−0.01), in which FIG. 11A is in the wide-angle end state, FIG. 11B is in the intermediate focal length state, and FIG. 11C is in the telephoto end state.

Figure 12A:
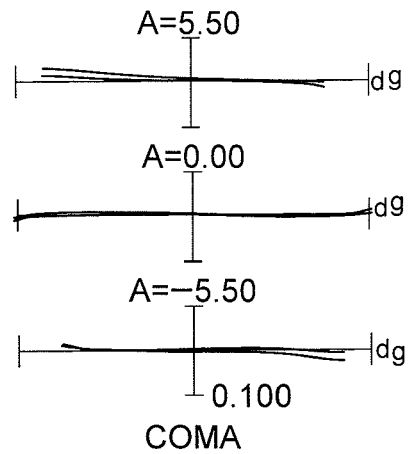
Figure 12B:
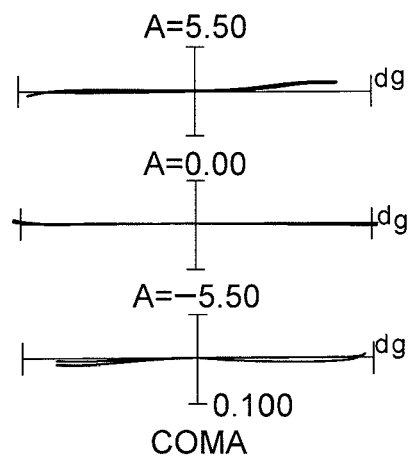

FIGS. 12A, and 12B are graphs showing coma of the zoom lens system according to Example 3 upon shifting a shift lens group (±0.1 mm) focusing on an infinitely distant object, in which FIG. 12A is in the wide-angle end state, and FIG. 12B is in the telephoto end state.

As is apparent from the respective graphs, the zoom lens system according to Example 3 shows superb optical performance as a result of good corrections to various aberrations in each focal length state from the wide-angle end state through the telephoto end state, even upon shifting the shift lens group.

EXAMPLE 4

Figure 13:
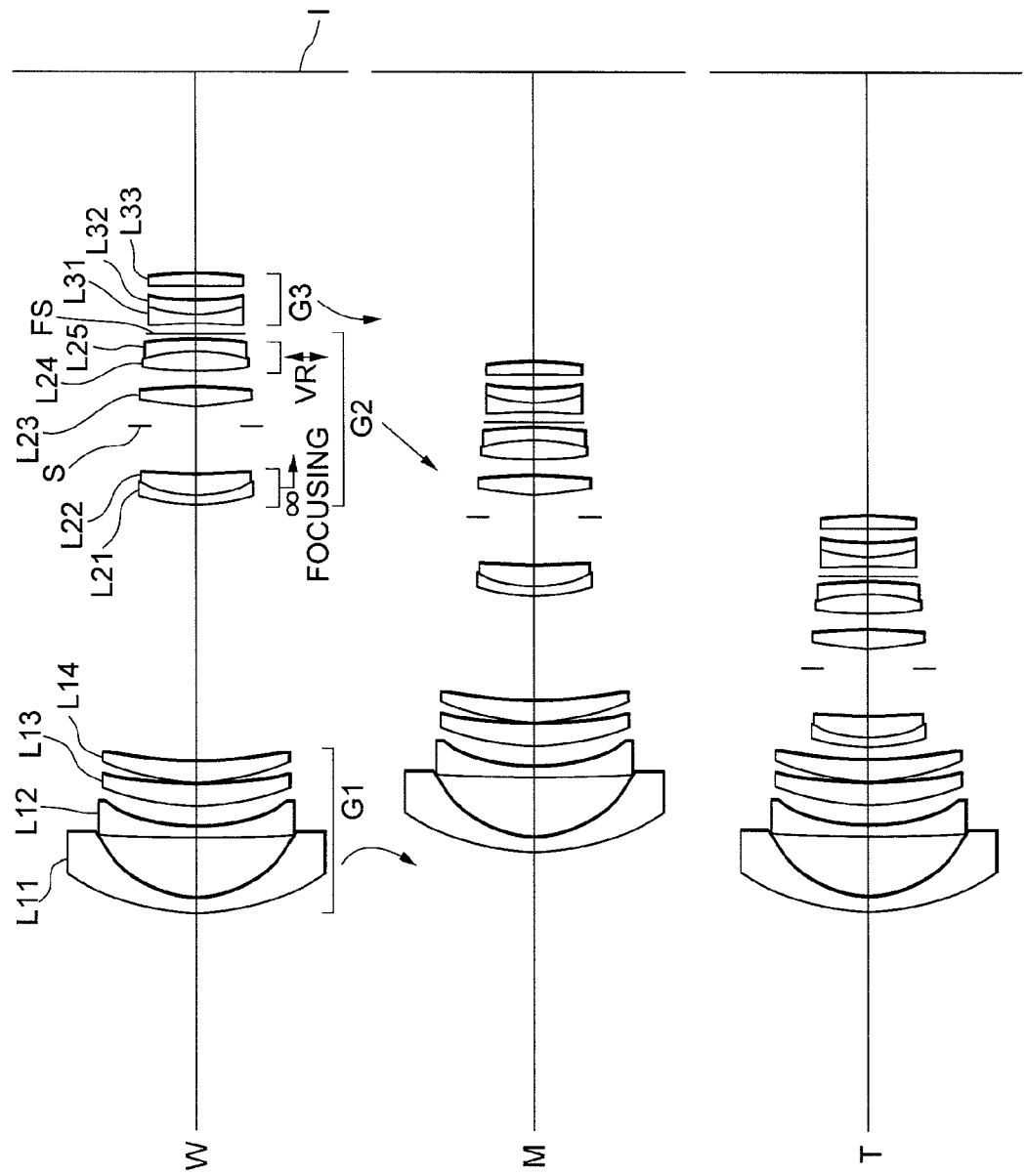
FIG. 13 is a sectional view showing a lens configuration of a zoom lens system according to Example 4 of the present application.

FIG. 13 is a sectional view showing a lens configuration of a zoom lens system according to Example 4 of the present application.

The zoom lens system according to Example 4 is composed of, in order from an object side, a first lens group G1 having negative refractive power, a second lens group G2 having positive refractive power, and a third lens group G3 having negative refractive power.

The first lens group G1 is composed of, in order from the object side, a negative meniscus lens L11 having a convex surface facing the object side, a negative meniscus lens L12 having a convex surface facing the object side, a positive meniscus lens L13 having a convex surface facing the object side, and a positive meniscus lens L14 having a convex surface facing the object side. Incidentally, the negative meniscus lens L11 is an aspherical lens in which an aspherical surface is formed on the image side lens surface.

The second lens group G2 is composed of, in order from the object side, a cemented positive lens constructed by a negative meniscus lens L21 having a convex surface facing the object side cemented with a positive meniscus lens L22 having a convex surface facing the object side, an aperture stop S, a double convex positive lens L23, a cemented positive lens constructed by a double convex positive lens L24 cemented with a negative meniscus lens L25 having a concave surface facing the object side, and a flare stopper FS. Incidentally, the negative meniscus lens L21 is an aspherical lens in which an aspherical surface is formed on the object side lens surface.

The third lens group G3 is composed of, in order from the object side, a cemented negative lens constructed by a double concave negative lens L31 cemented with a positive meniscus lens L32 having a convex surface facing the object side, and a positive meniscus lens L33 having a concave surface facing the object side. Incidentally, the positive meniscus lens L33 is an aspherical lens in which an aspherical surface is formed on the image side lens surface.

In the zoom lens system according to Example 4, upon zooming from a wide-angle end state to a telephoto end state, the first lens group G1, the second lens group G2, and the third lens group G3 move along the optical axis such that a distance between the first lens group G1 and the second lens group G2 decreases, and a distance between the second lens group G2 and the third lens group G3 varies.

In the zoom lens system according to Example 4, the cemented positive lens constructed by the negative meniscus lens L21 cemented with the positive meniscus lens L22 in the second lens group G2 is moved to the image side as a focusing lens group, thereby carrying out focusing from an infinitely distant object to a close object.

In the zoom lens system according to Example 4, the cemented positive lens constructed by the positive lens L24 cemented with the negative meniscus lens L25 in the second lens group G2 is moved as a shift lens group in a direction including a component perpendicular to the optical axis, thereby correcting an image blur.

Various values associated with the zoom lens system according to Example 4 are listed in Table 4.

TABLE 4

(Specifications)
Zoom Ratio = 2.825

| | W | M | T |
|---|---|---|---|
| f = | 10.3 | 17.3 | 29.1 |
| FNO = | 3.63 | 4.35 | 5.83 |
| 2ω = | 80.24 | 51.18 | 31.56 |
| Y = | 8.25 | 8.25 | 8.25 |
| TL = | 77.62 | 71.79 | 77.44 |
| BF = | 18.49 | 26.59 | 40.52 |

(Lens Data)

| i | r | d | nd | νd |
|---|---|---|---|---|
| OP | ∞ | | | |
| 1 | 21.1624 | 1.3000 | 1.851348 | 40.10 |
| *2 | 9.1533 | 5.6715 | | |
| 3 | 183.3314 | 1.0000 | 1.882997 | 40.76 |
| 4 | 16.4545 | 1.9218 | | |
| 5 | 22.9775 | 2.0000 | 1.846660 | 23.78 |
| 6 | 38.6113 | 0.2000 | | |
| 7 | 19.9798 | 2.0000 | 1.808090 | 22.79 |
| 8 | 43.9471 | (d8) | | |
| *9 | 18.8319 | 0.8000 | 1.834410 | 37.28 |
| 10 | 10.9539 | 2.0000 | 1.729157 | 54.66 |
| 11 | 58.3204 | (d11) | | |
| 12 | ∞ | 1.8500 | Aperture Stop S | |
| 13 | 20.4401 | 1.7293 | 1.487490 | 70.40 |
| 14 | −55.3404 | 1.5000 | | |
| 15 | 33.3970 | 1.8500 | 1.617200 | 54.01 |
| 16 | −18.7603 | 1.0000 | 1.755199 | 27.51 |
| 17 | −59.2931 | 0.6000 | | |
| 18 | ∞ | (d18) | Flare Stopper FS | |
| 19 | −83.0798 | 0.8000 | 1.806100 | 40.94 |
| 20 | 13.0017 | 1.3000 | 1.677900 | 55.40 |
| 21 | 24.8837 | 1.358 | | |
| 22 | −266.4009 | 1.1500 | 1.730770 | 40.51 |
| *23 | −38.7140 | BF | | |
| I | ∞ | | | |

(Aspherical Surface Data)

Surface Number: 2

K = 0.6796
C4 = −4.72344E−06
C6 = 1.65253E−07
C8 = −1.48790E−09
C10 = −9.66922E−13

Surface Number: 9

K = 1.0000
C4 = −1.27907E−05
C6 = −7.54124E−08
C8 = 0.00000E+00
C10 = 0.00000E+00

Surface Number: 23

K = −6.2766
C4 = 6.20471E−05
C6 = 5.84177E−07
C8 = −2.35856E−09
C10 = 0.00000E+00

TABLE 4-continued (Variable Distances)

| | W | M | T |
|---|---|---|---|
| <upon focusing on an infinitely distant object> ||||
| f = | 10.30000 | 17.30000 | 29.10000 |
| d8 = | 23.68230 | 9.70150 | 1.44017 |
| d11 = | 4.45228 | 4.45228 | 4.45228 |
| d18 = | 0.96721 | 1.02197 | 0.99017 |
| BF = | 18.49472 | 26.58717 | 40.52334 |
| <upon focusing on a close object, shooting magnification = −0.01> ||||
| d0 = | 1010.3029 | 1712.6194 | 2894.2493 |
| f = | 10.30000 | 17.30000 | 29.10000 |
| d8 = | 23.98397 | 9.87986 | 1.55763 |
| d11 = | 4.15062 | 4.27392 | 4.33481 |
| d18 = | 0.96721 | 1.02197 | 0.99017 |
| BF = | 18.49472 | 26.58717 | 40.52334 |

(Lens Group Data)

| Group | ST | Focal Length |
|---|---|---|
| 1 | 1 | −17.3619 |
| 2 | 9 | 15.647 |
| 3 | 19 | −34.1739 |

(Values for Conditional Expressions)

(1) (−f1)/fw = 1.686
(2) (−f1)/ft = 0.597
(3) |fw/ff| = 0.238
(4) |fyw| = 0.342
(5) ff/fs = 1.023

Figure 14A:
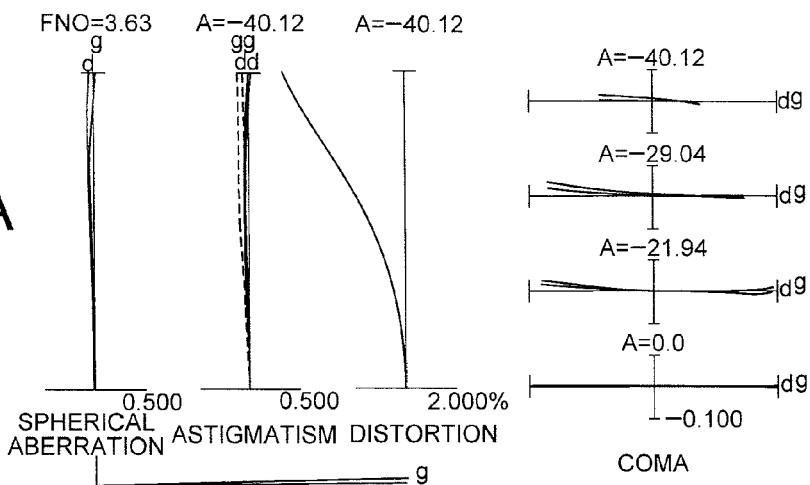
Figure 14B:
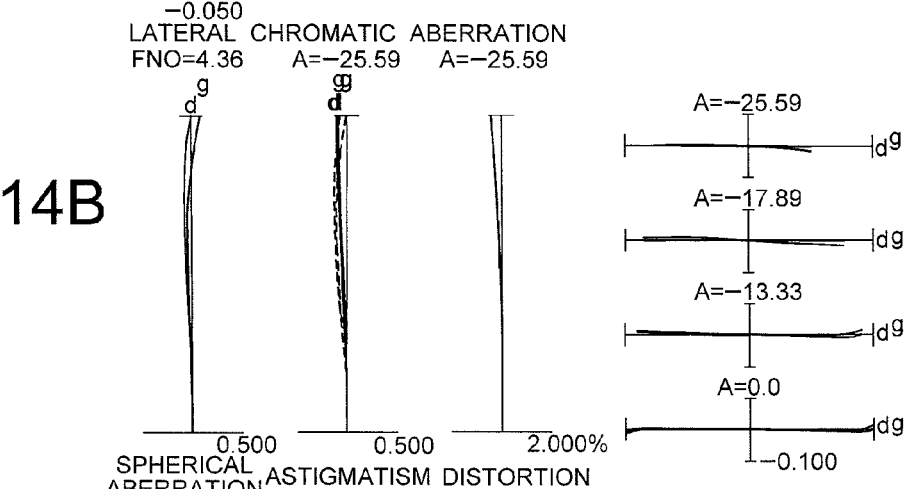
Figure 14C:
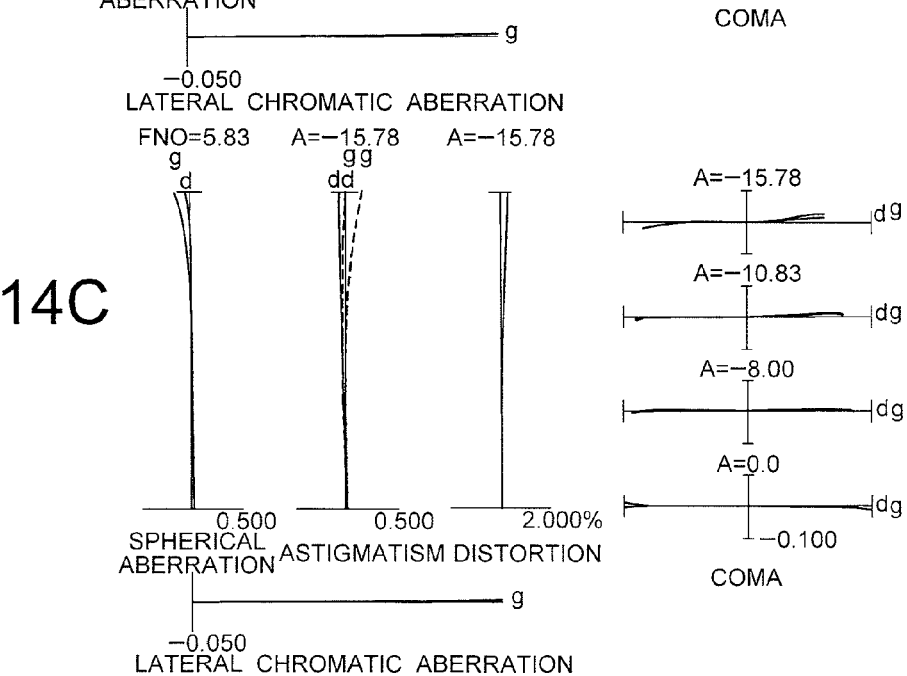

FIGS. 14A, 14B, and 14C are graphs showing various aberrations of the zoom lens system according to Example 4 focusing on an infinitely distant object, in which FIG. 14A is in a wide-angle end state, FIG. 14B is in an intermediate focal length state, and FIG. 14C is in a telephoto end state.

Figure 15A:
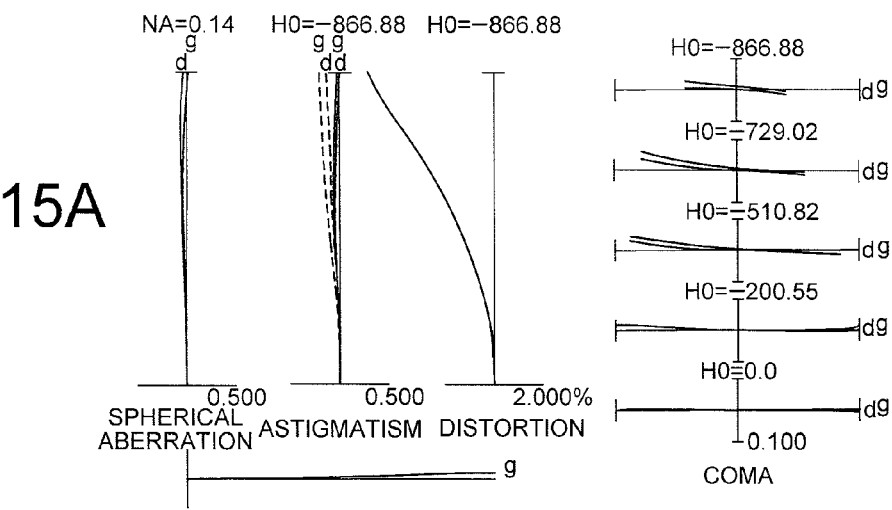
Figure 15B:
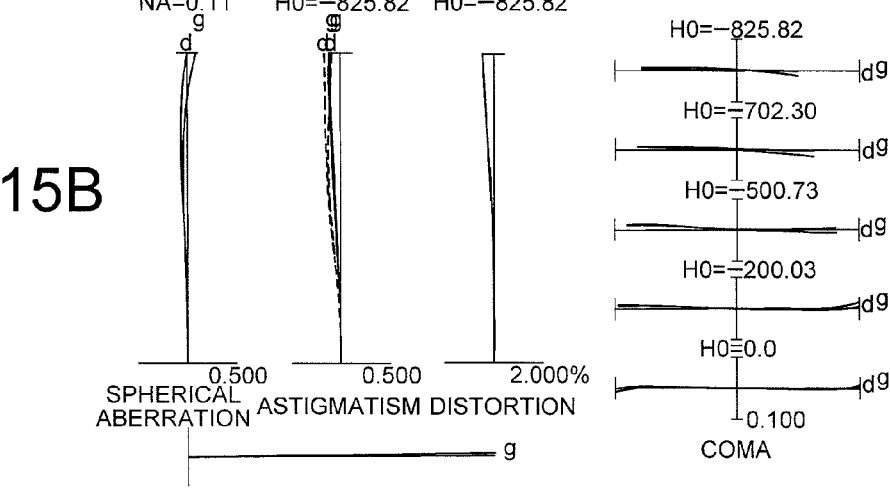
Figure 15C:
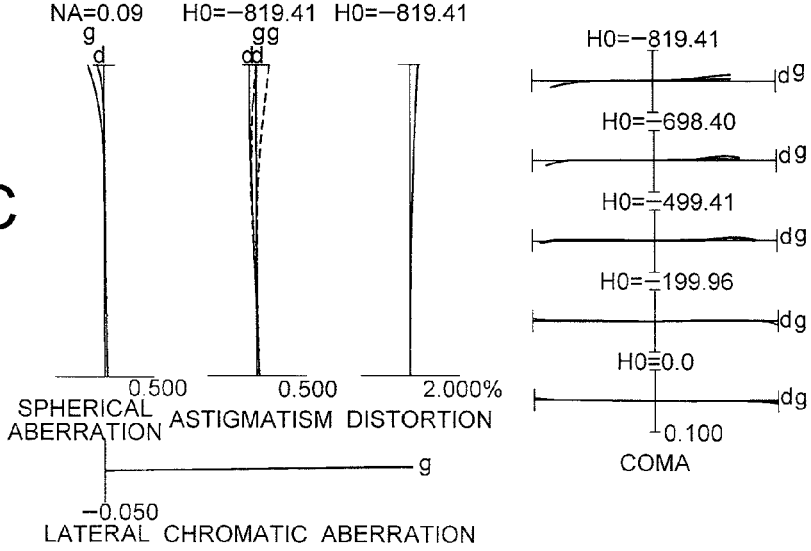

FIGS. 15A, 15B, and 15C are graphs showing various aberrations of the zoom lens system according to Example 4 focusing on a close object (shooting magnification=−0.01), in which FIG. 15A is in the wide-angle end state, FIG. 15B is in the intermediate focal length state, and FIG. 15C is in the telephoto end state.

Figure 16A:
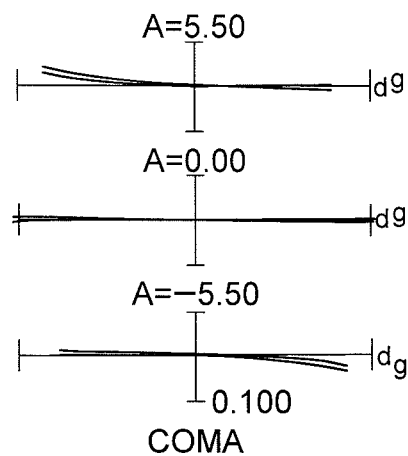
Figure 16B:
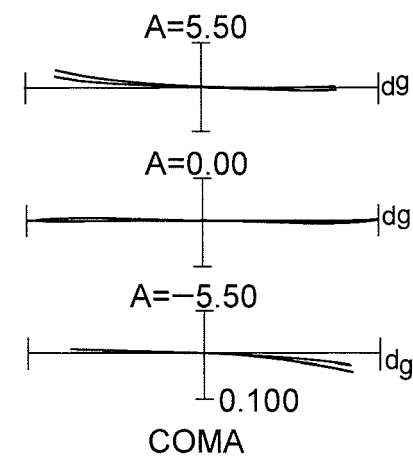

FIGS. 16A, and 16B are graphs showing coma of the zoom lens system according to Example 4 upon shifting a shift lens group (±0.1 mm) focusing on an infinitely distant object, in which FIG. 16A is in the wide-angle end state, and FIG. 16B is in the telephoto end state.

As is apparent from the respective graphs, the zoom lens system according to Example 4 shows superb optical performance as a result of good corrections to various aberrations in each focal length state from the wide-angle end state through the telephoto end state, even upon shifting the shift lens group.

EXAMPLE 5

Figure 17:
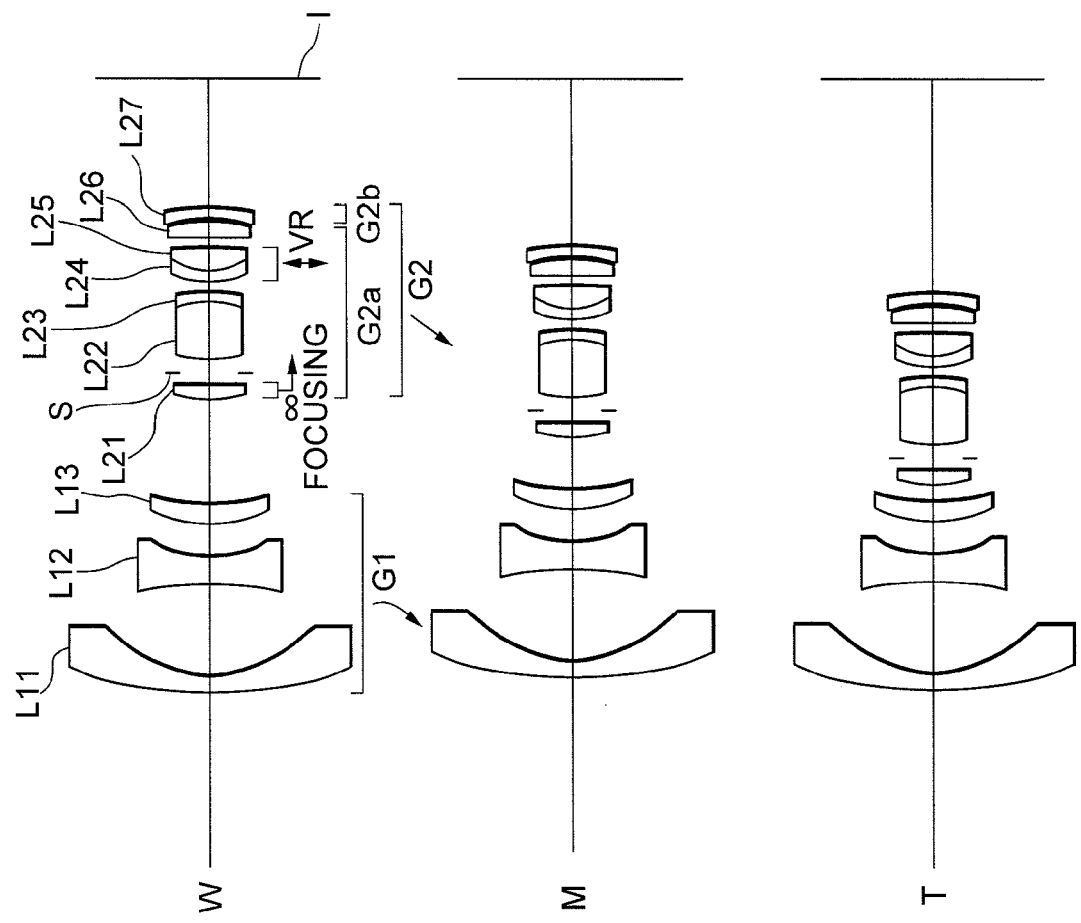
FIG. 17 is a sectional view showing a lens configuration of a zoom lens system seen from another point of view according to Example 5 of the present application.

FIG. 17 is a sectional view showing a lens configuration of a zoom lens system seen from another point of view according to Example 5 of the present application.

The zoom lens system seen from another point of view according to Example 5 is composed of, in order from an object side, a first lens group G1 having negative refractive power and a second lens group G2 having positive refractive power.

The first lens group G1 is composed of, in order from the object side, a negative meniscus lens L11 having a convex surface facing the object side, a double concave negative lens L12, and a positive meniscus lens L13 having a convex surface facing the object side. Incidentally, the negative meniscus lens L11 is an aspherical lens in which an aspherical surface is formed on each of both lens surfaces. The double concave negative lens L12 is an aspherical lens in which an aspherical surface is formed on the image side lens surface.

The second lens group G2 is composed of, in order from the object side, a front sub-lens group G2a having positive refractive power and a rear sub-lens group G2b having negative refractive power.

The front sub-lens group G2a is composed of, in order from the object side, a positive meniscus lens L21 having a convex surface facing the object side, an aperture stop S, a cemented positive lens constructed by a double convex positive lens L22 cemented with a negative meniscus lens L23 having a concave surface facing the object side, a cemented positive lens constructed by a negative meniscus lens L24 having a convex surface facing the object side cemented with a double convex positive lens L25, and a positive meniscus lens L26 having a convex surface facing the image side.

The rear sub-lens group G2b is composed of only a negative meniscus lens L27 having a convex surface facing the image side. Incidentally, the negative meniscus lens L27 is an aspherical lens in which an aspherical surface is formed on the image side lens surface.

In the zoom lens system seen from another point of view according to Example 5, upon zooming from a wide-angle end state to a telephoto end state, the first lens group G1 and the second lens group G2 move along the optical axis such that a distance between the first lens group G1 and the second lens group G2 decreases.

In the zoom lens system seen from another point of view according to Example 5, the positive meniscus lens L21 in the front sub-lens group G2a is moved to the image side as a focusing lens group, thereby carrying out focusing from an infinitely distant object to a close object.

In the zoom lens system seen from another point of view according to Example 5, the cemented positive lens constructed by the negative meniscus lens L24 cemented with the positive lens L25 in the front sub-lens group G2a is moved as a shift lens group in a direction including a component perpendicular to the optical axis, thereby correcting an image blur.

Various values associated with the zoom lens system seen from another point of view according to Example 5 are listed in Table 5.

TABLE 5

(Specifications)
Zoom Ratio = 1.828

| | W | M | T |
|---|---|---|---|
| f = | 6.90 | 9.50 | 12.61 |
| FNO = | 3.62 | 4.52 | 5.77 |
| 2ω = | 98.83 | 79.61 | 63.97 |
| Y = | 7.962 | 7.962 | 7.962 |
| TL = | 70.23 | 68.58 | 69.98 |
| BF = | 14.66 | 19.26 | 24.75 |

(Lens Data)

| i | r | d | nd | νd |
|---|---|---|---|---|
| OP | ∞ | | | |
| *1 | 65.6582 | 1.8000 | 1.768020 | 49.23 |
| *2 | 11.1606 | 10.6000 | | |
| 3 | −41.8065 | 3.2000 | 1.768020 | 49.23 |

TABLE 5-continued

| | | | | |
|---|---|---|---|---|
| *4 | 17.5136 | 3.8000 | | |
| 5 | 14.4408 | 2.3000 | 1.922860 | 20.88 |
| 6 | 23.0940 | (d6) | | |
| 7 | 13.2190 | 1.5000 | 1.754999 | 52.32 |
| 8 | 37.9290 | (d8) | | |
| 9 | ∞ | 1.5000 | Aperture Stop S | |
| 10 | 21.6826 | 6.5000 | 1.497820 | 82.56 |
| 11 | −9.3713 | 1.0000 | 1.883000 | 40.77 |
| 12 | −50.0183 | 1.4211 | | |
| 13 | 11.9486 | 1.2000 | 1.903660 | 31.31 |
| 14 | 7.9899 | 2.5000 | 1.497820 | 82.56 |
| 15 | −409.7597 | 1.2528 | | |
| 16 | −5817.7134 | 1.8000 | 1.497820 | 82.56 |
| 17 | −17.3100 | 0.4000 | | |
| 18 | −13.7854 | 1.2000 | 1.768020 | 49.23 |
| *19 | −21.3255 | BF | | |
| I | ∞ | | | |

(Aspherical Surface Data)

Surface Number: 1

K = 11.2695
C4 = 6.52080E−06
C6 = 4.51110E−09
C8 = 0.00000E+00
C10 = 0.00000E+00

Surface Number: 2

K = −0.6591
C4 = 0.00000E+00
C6 = 0.00000E+00
C8 = 0.00000E+00
C10 = 0.00000E+00

Surface Number: 4

K = 2.7380
C4 = 1.54320E−04
C6 = 3.81860E−07
C8 = 0.00000E+00
C10 = 0.00000E+00

Surface Number: 19

K = −21.6774
C4 = −1.35420E−04
C6 = 5.07390E−06
C8 = −6.22800E−08
C10 = 0.00000E+00

(Variable Distances)

| | W | M | T |
|---|---|---|---|
| <upon focusing on an infinitely distant object> | | | |
| f = | 6.90000 | 9.50000 | 12.61000 |
| d6 = | 11.99855 | 5.74872 | 1.65810 |
| d8 = | 1.59738 | 1.59738 | 1.59738 |
| BF = | 14.66442 | 19.25604 | 24.74833 |
| <upon focusing on a close object, shooting magnification = −0.01> | | | |
| d0 = | 675.3095 | 936.2195 | 1247.7556 |
| f = | 6.90000 | 9.50000 | 12.61000 |
| d6 = | 12.14042 | 5.84296 | 1.72955 |
| d8 = | 1.45551 | 1.50314 | 1.52593 |
| BF = | 14.66442 | 19.25605 | 24.74834 |

(Lens Group Data)

| Group | ST | Focal Length |
|---|---|---|
| 1 | 1 | −9.446 |
| 2 | 7 | 16.681 |
| 2a | 7 | 15.399 |
| 2b | 18 | −54.536 |

(Values for Conditional Expressions)

(3) |fw/ff| = 0.263
(4) |fyw| = 0.487

TABLE 5-continued (5) ff/fs = 0.743
(6) Σ2a/Σ2b = 16.893
(7) |fa/fb| = 0.282

Figure 18A:
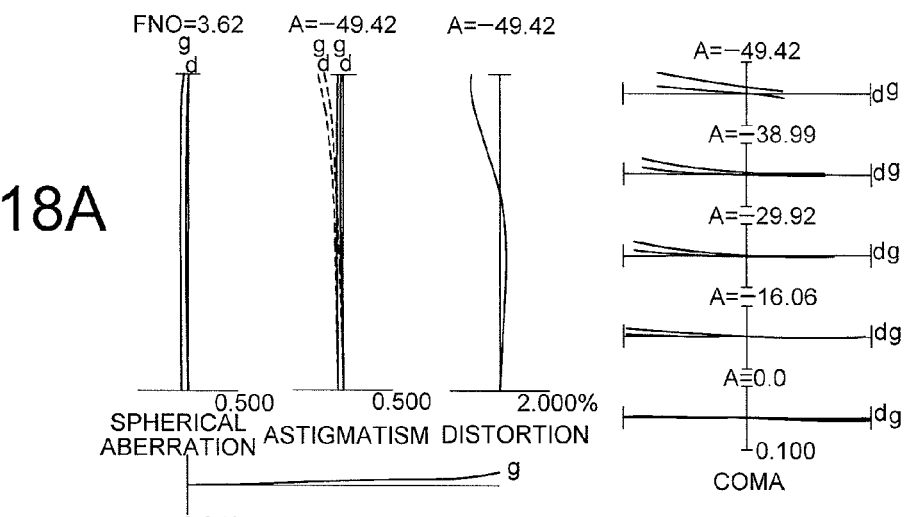
Figure 18B:
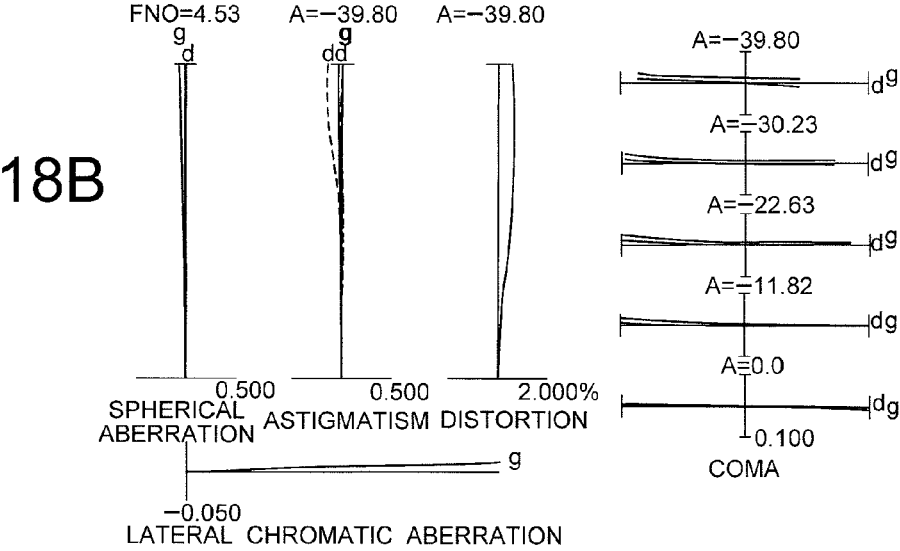
Figure 18C:
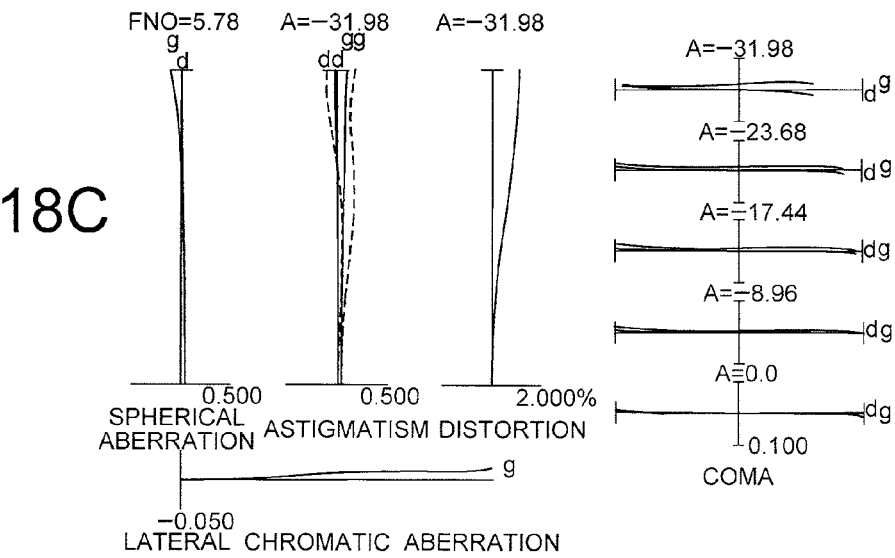

FIGS. 18A, 18B, and 18C are graphs showing various aberrations of the zoom lens system seen from another point of view according to Example 5 focusing on an infinitely distant object, in which FIG. 18A is in a wide-angle end state, FIG. 18B is in an intermediate focal length state, and FIG. 18C is in a telephoto end state.

Figure 19A:
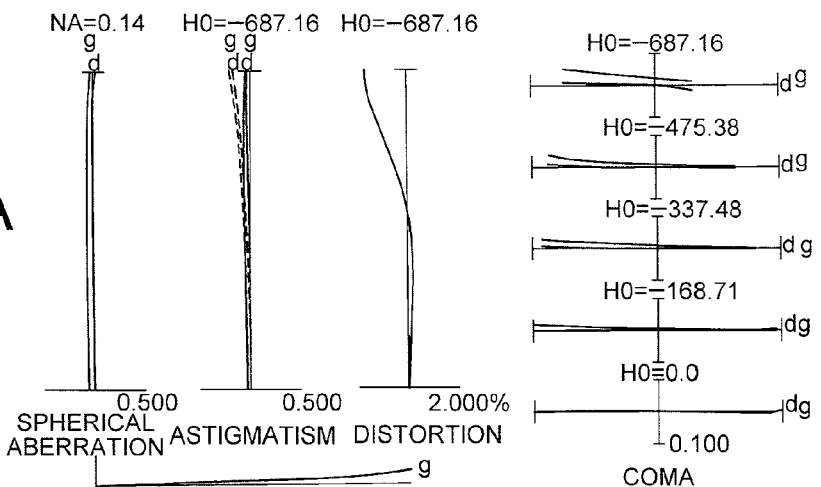
Figure 19B:
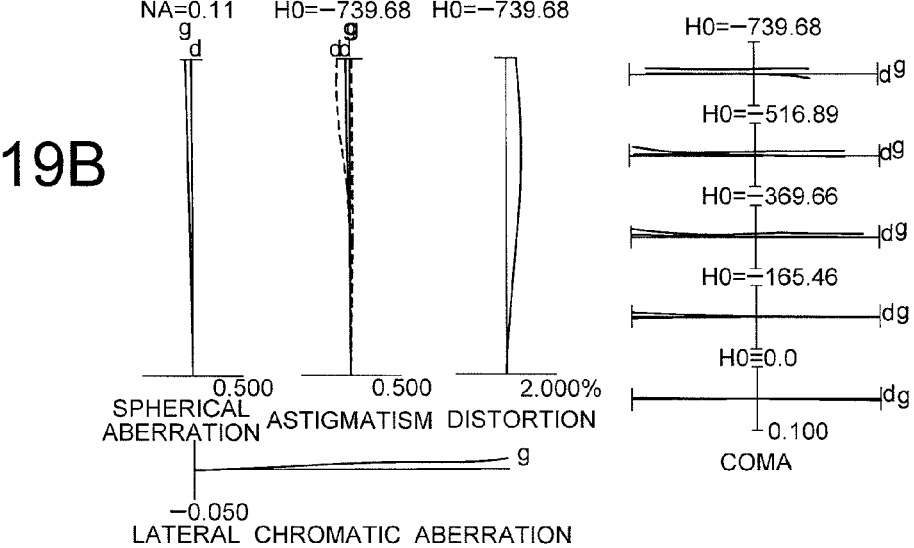
Figure 19C:
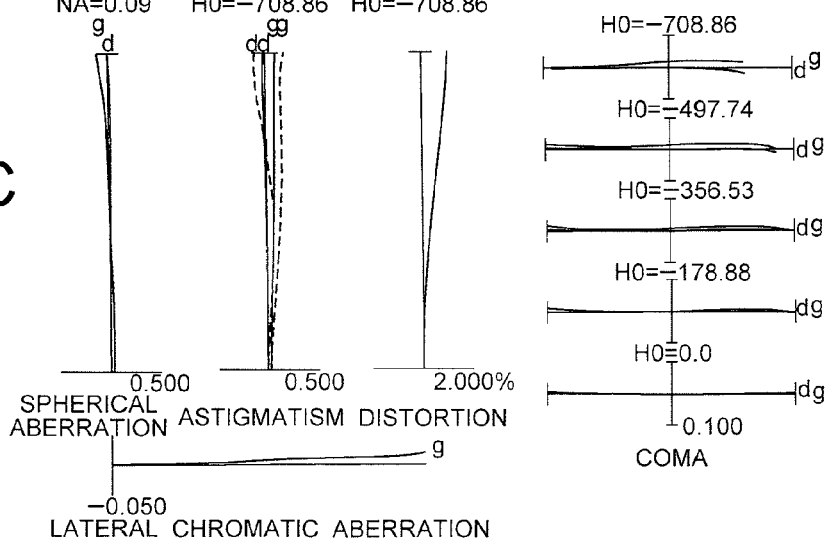

FIGS. 19A, 19B, and 19C are graphs showing various aberrations of the zoom lens system seen from another point of view according to Example 5 focusing on a close object (shooting magnification=−0.01), in which FIG. 19A is in the wide-angle end state, FIG. 19B is in the intermediate focal length state, and FIG. 19C is in the telephoto end state.

Figure 20A:
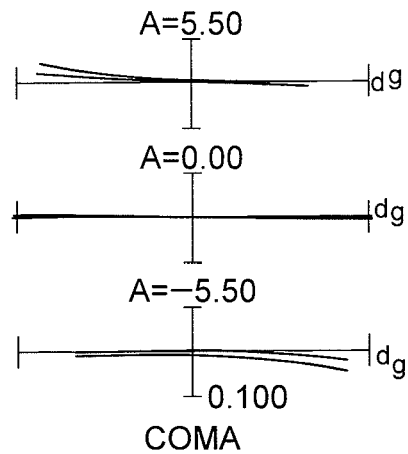
Figure 20B:
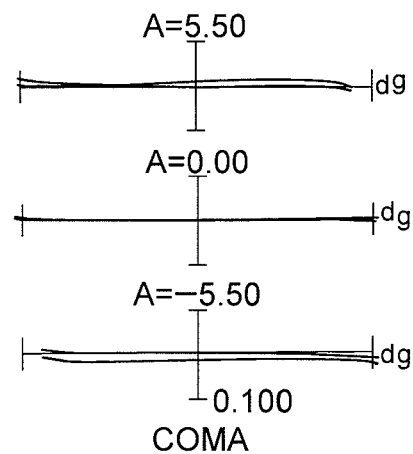

FIGS. 20A, and 20B are graphs showing coma of the zoom lens system seen from another point of view according to Example 5 upon shifting a shift lens group (±0.1 mm) focusing on an infinitely distant object, in which FIG. 20A is in the wide-angle end state, and FIG. 20B is in the telephoto end state.

As is apparent from the respective graphs, the zoom lens system seen from another point of view according to Example 5 shows superb optical performance as a result of good corrections to various aberrations in each focal length state from the wide-angle end state through the telephoto end state, even upon shifting the shift lens group.

EXAMPLE 6

Figure 21:
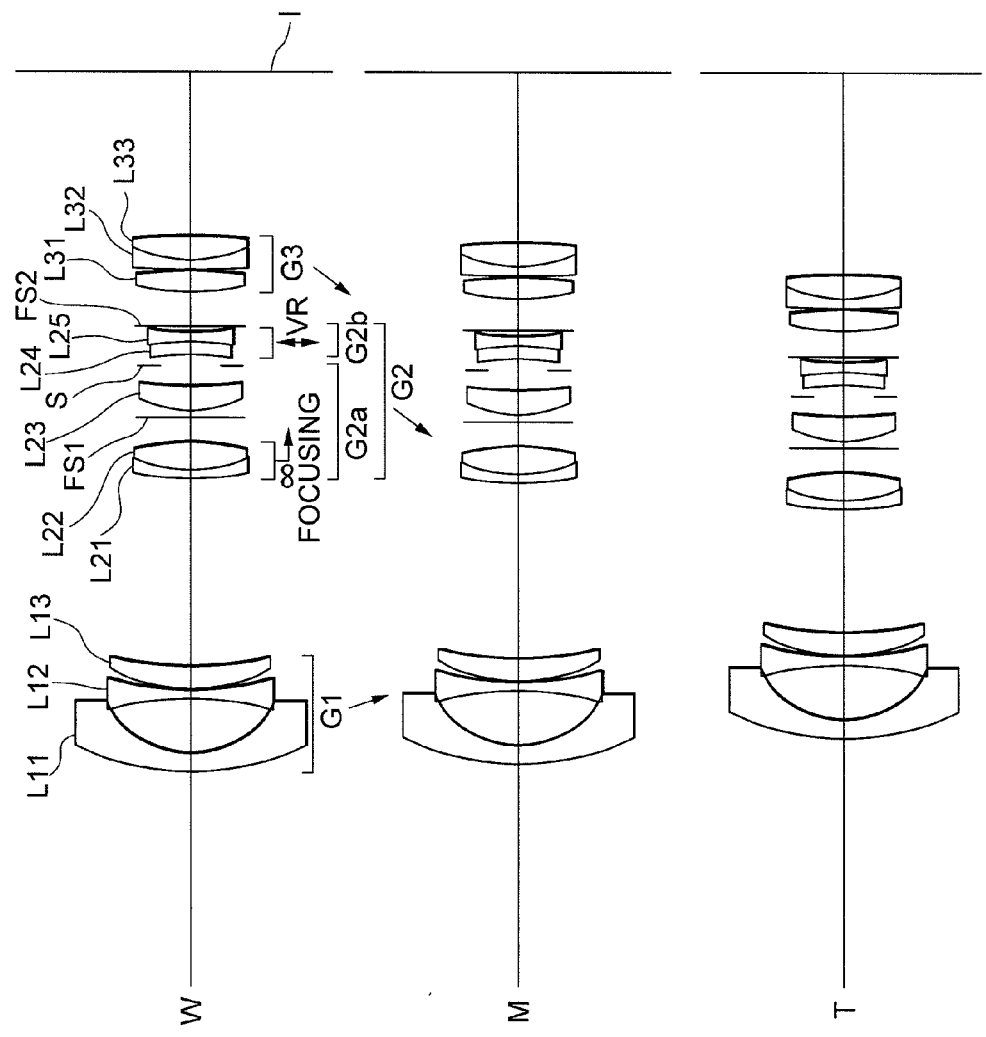
FIG. 21 is a sectional view showing a lens configuration of a zoom lens system seen from another point of view according to Example 6 of the present application.

FIG. 21 is a sectional view showing a lens configuration of a zoom lens system seen from another point of view according to Example 6 of the present application.

The zoom lens system seen from another point of view according to Example 6 is composed of, in order from an object side, a first lens group G1 having negative refractive power, a second lens group G2 having positive refractive power, and a third lens group G3 having positive refractive power.

The first lens group G1 is composed of, in order from the object side, a negative meniscus lens L11 having a convex surface facing the object side, a double concave negative lens L12, and a positive meniscus lens L13 having a convex surface facing the object side. Incidentally, the negative meniscus lens L11 is an aspherical lens in which an aspherical surface is formed on the image side lens surface.

The second lens group G2 is composed of, in order from the object side, a front sub-lens group G2a having positive refractive power and a rear sub-lens group G2b having negative refractive power.

The front sub-lens group G2a is composed of, in order from the object side, a cemented positive lens constructed by a negative meniscus lens L21 having a convex surface facing the object side cemented with a double convex positive lens L22, a first flare stopper FS1, a positive meniscus lens L23 having a convex surface facing the object side, and an aperture stop S.

The rear sub-lens group G2b is composed of, in order from the object side, a cemented negative lens constructed by a positive meniscus lens L24 having a concave surface facing the object side cemented with a double concave negative lens L25, and a second flare stopper FS2. Incidentally, the positive meniscus lens L24 is an aspherical lens in which an aspherical surface is formed on the object side lens surface.

The third lens group G3 is composed of, in order from the object side, a double convex positive lens L31, and a cemented positive lens constructed by a negative meniscus lens L32 having a convex surface facing the object side cemented with a double convex positive lens L33. Incidentally, the positive lens L31 is an aspherical lens in which an aspherical surface is formed on the image side lens surface.

In the zoom lens system seen from another point of view according to Example 6, upon zooming from a wide-angle end state to a telephoto end state, the first lens group G1, the second lens group G2, and the third lens group G3 move along the optical axis such that a distance between the first lens group G1 and the second lens group G2 decreases, and a distance between the second lens group G2 and the third lens group G3 decreases.

In the zoom lens system seen from another point of view according to Example 6, the cemented positive lens constructed by the negative meniscus lens L21 cemented with the positive lens L22 in the front sub-lens group G2a is moved to the image side as a focusing lens group, thereby carrying out focusing from an infinitely distant object to a close object.

In the zoom lens system seen from another point of view according to Example 6, the cemented negative lens constructed by the positive meniscus lens L24 cemented with the negative lens L25 in the rear sub-lens group G2b is moved as a shift lens group in a direction including a component perpendicular to the optical axis, thereby correcting an image blur.

Various values associated with the zoom lens system seen from another point of view according to Example 6 are listed Table 6.

TABLE 6

(Specifications)
Zoom Ratio = 2.825

|  | W | M | T |
|---|---|---|---|
| f = | 10.3 | 18.7 | 29.1 |
| FNO = | 3.64 | 4.23 | 5.86 |
| 2ω = | 78.78 | 46.56 | 30.67 |
| Y = | 7.962 | 7.962 | 7.962 |
| TL = | 66.55 | 62.74 | 68.78 |
| BF = | 15.48 | 25.28 | 36.78 |

(Lens Data)

| i | r | d | nd | νd |
|---|---|---|---|---|
| OP | ∞ |  |  |  |
| 1 | 25.0000 | 1.8000 | 1.743300 | 49.32 |
| *2 | 8.5722 | 5.2284 |  |  |
| 3 | −31.9974 | 0.8000 | 1.496999 | 81.54 |
| 4 | 25.7099 | 0.1500 |  |  |
| 5 | 16.2678 | 2.1558 | 1.846660 | 23.78 |
| 6 | 33.0579 | (d6) |  |  |
| 7 | 27.3560 | 0.8000 | 1.795041 | 28.69 |
| 8 | 12.7778 | 2.6232 | 1.603001 | 65.44 |
| 9 | −27.7840 | (d9) |  |  |
| 10 | ∞ | 0.6778 | Flare Stopper FS1 | |
| 11 | 10.6214 | 2.3407 | 1.603001 | 65.44 |
| 12 | 28.5797 | 1.8566 |  |  |
| 13 | ∞ | 1.0996 | Aperture Stop S | |
| *14 | −27.4165 | 1.3691 | 1.821145 | 24.06 |
| 15 | −17.0648 | 0.8000 | 1.754998 | 52.32 |
| 16 | 21.3149 | 0.5500 |  |  |
| 17 | ∞ | (d17) | Flare Stopper FS2 | |
| 18 | 18.9858 | 2.0521 | 1.677900 | 54.89 |
| *19 | −30.4460 | 0.1500 |  |  |
| 20 | 155.5536 | 0.8000 | 1.850260 | 32.35 |
| 21 | 12.8042 | 2.3802 | 1.603001 | 65.44 |

TABLE 6-continued

| 22 | −74.1840 | BF |
| I | ∞ |  |

(Aspherical Surface Data)

Surface Number: 2

K = 0.8028
C4 = −2.11830E−06
C6 = −2.66050E−09
C8 = 1.19660E−09
C10 = −3.08550E−11

Surface Number: 14

K = −7.4148
C4 = 2.77450E−05
C6 = −2.03840E−06
C8 = 2.71760E−07
C10 = −9.60030E−09

Surface Number: 19

K = 0.2983
C4 = 1.58800E−04
C6 = 1.88510E−06
C8 = −5.09710E−08
C10 = 8.84260E−10

(Variable Distances)

| | W | M | T |
|---|---|---|---|
| <upon focusing on an infinitely distant object> | | | |
| f= | 10.30000 | 18.74998 | 29.09995 |
| d6= | 17.86509 | 5.84890 | 1.00000 |
| d9= | 2.36528 | 2.36528 | 2.36528 |
| d17= | 3.20972 | 1.61399 | 1.00000 |
| BF= | 15.48011 | 25.28115 | 36.78476 |
| <upon focusing on a close object, shooting magnification = −0.01> | | | |
| d0 = | 1006.0724 | 1855.1767 | 2891.6589 |
| f = | 10.30000 | 18.74998 | 29.09995 |
| d6 = | 18.13661 | 5.97474 | 1.08438 |
| d9 = | 2.09376 | 2.23944 | 2.28090 |
| d17 = | 3.20972 | 1.61399 | 1.00000 |
| BF= | 15.48033 | 25.28137 | 36.78498 |

(Lens Group Data)

| Group | ST | Focal Length |
|---|---|---|
| 1 | 1 | −15.354 |
| 2 | 7 | 16.815 |
| 2a | 7 | 14.188 |
| 2b | 14 | −15.968 |
| 3 | 18 | 19.476 |

(Values for Conditional Expressions)

(3) |fw/ff| = 0.381
(4) |fγw| = 0.381
(5) ff/fs = −1.782
(6) Σ2a/Σ2b = 4.060
(7) |fa/fb| = 0.889

Figure 22A:
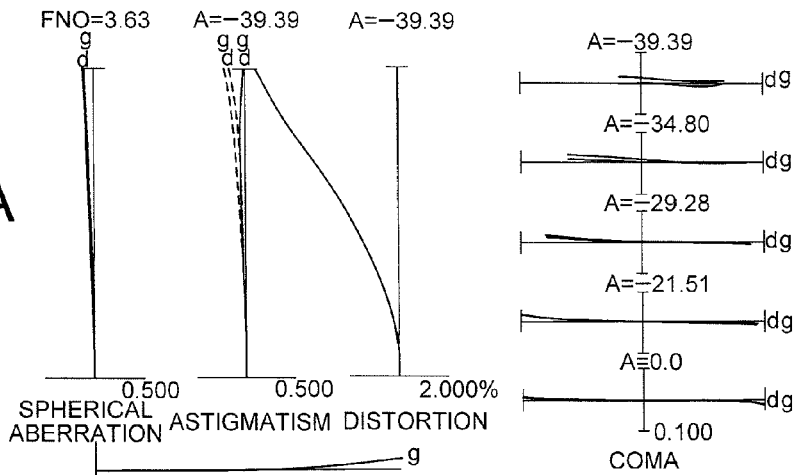
Figure 22B:
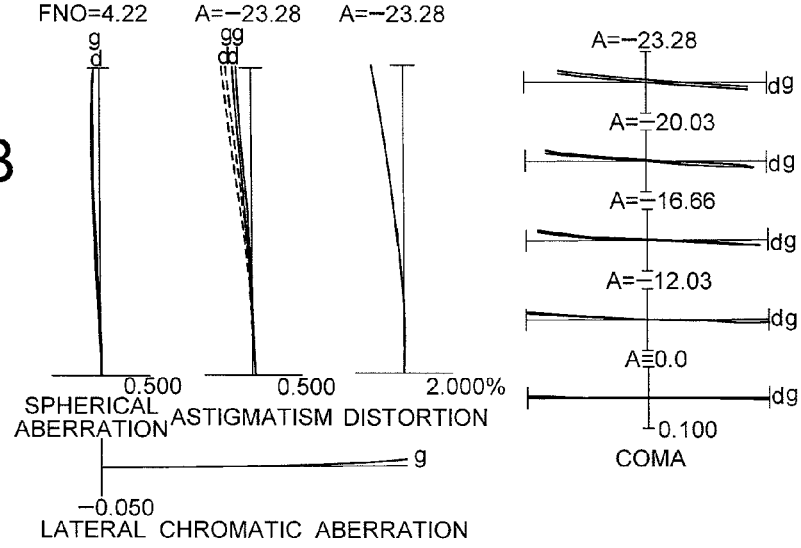
Figure 22C:
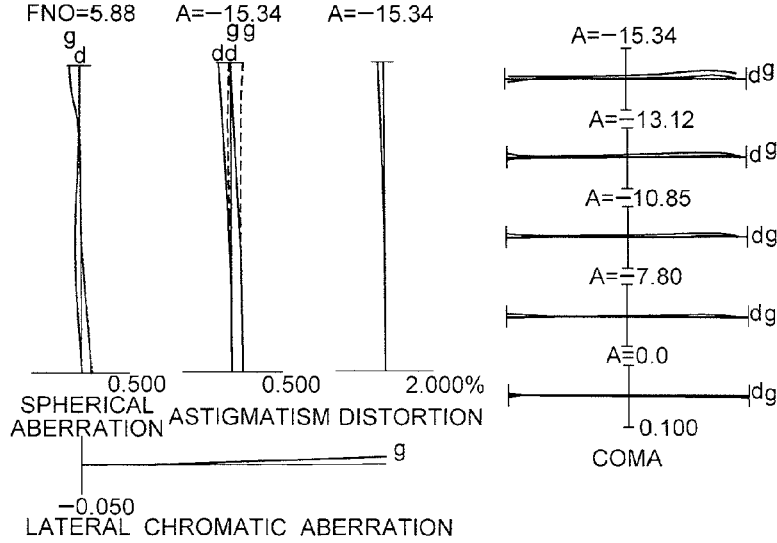

FIGS. 22A, 22B, and 22C are graphs showing various aberrations of the zoom lens system seen from another point of view according to Example 6 focusing on an infinitely distant object, in which FIG. 22A is in a wide-angle end state, FIG. 22B is in an intermediate focal length state, and FIG. 22C is in a telephoto end state.

Figure 23A:
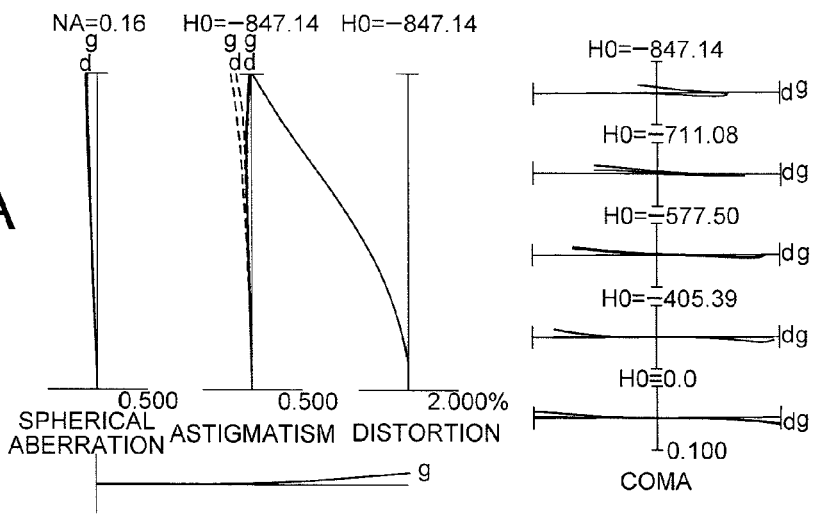
Figure 23B:
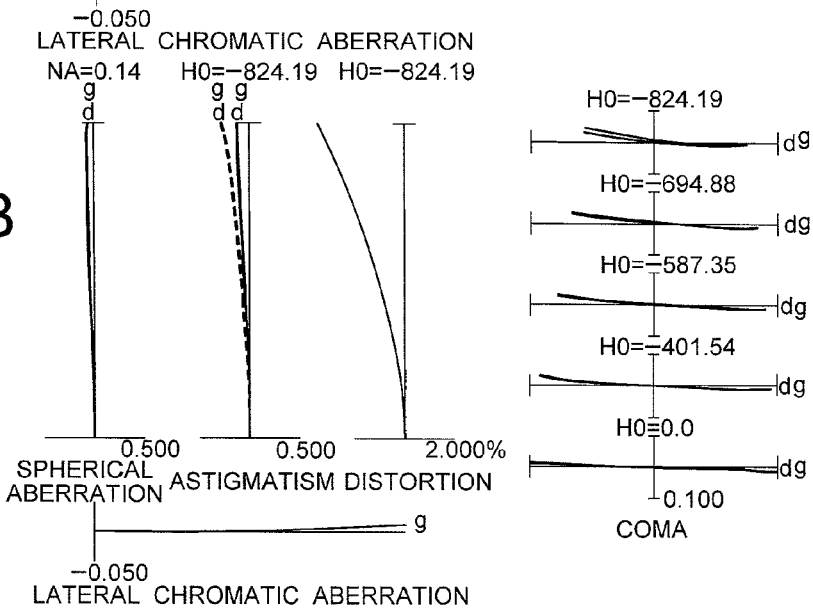
Figure 23C:
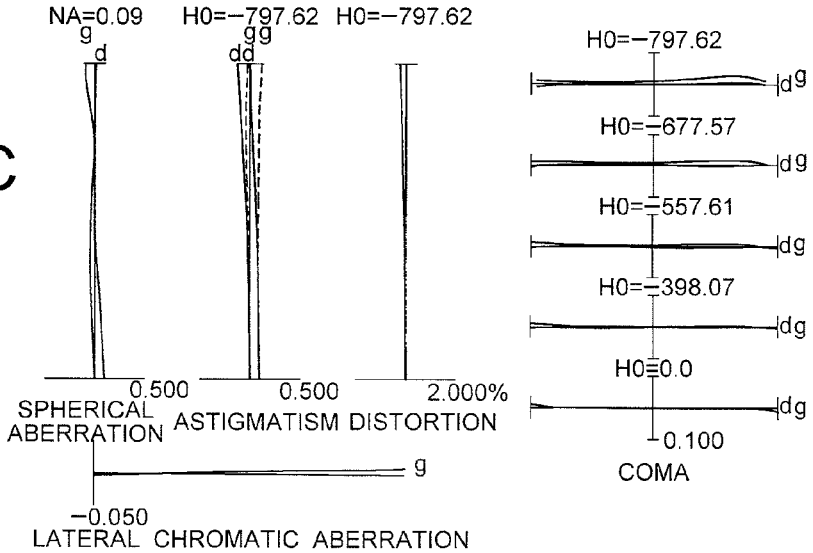

FIGS. 23A, 23B, and 23C are graphs showing various aberrations of the zoom lens system seen from another point of view according to Example 6 focusing on a close object (shooting magnification=−0.01), in which FIG. 23A is in the wide-angle end state, FIG. 23B is in the intermediate focal length state, and FIG. 23C is in the telephoto end state.

Figure 24A:
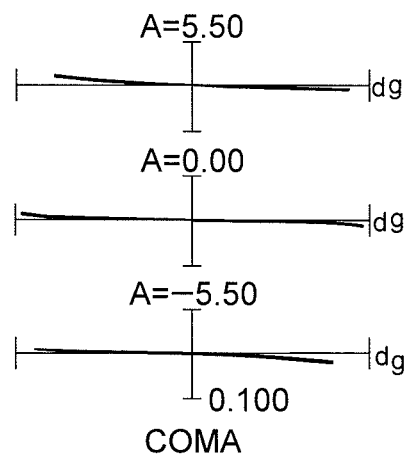
Figure 24B:
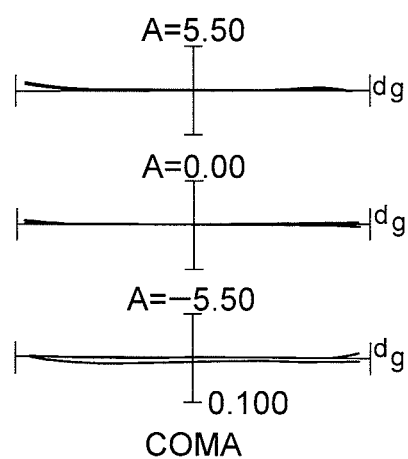

FIGS. 24A, and 24B are graphs showing coma of the zoom lens system seen from another point of view according to Example 6 upon shifting a shift lens group (±0.1 mm) focusing on an infinitely distant object, in which FIG. 24A is in the wide-angle end state, and FIG. 24B is in the telephoto end state.

As is apparent from the respective graphs, the zoom lens system seen from another point of view according to Example 6 shows superb optical performance as a result of good corrections to various aberrations in each focal length state from the wide-angle end state through the telephoto end state, even upon shifting the shift lens group.

Each Example described above makes it possible to realize a downsized zoom lens system having excellent optical performance and a zoom ratio of about three capable of correcting an image blur.

In the zoom lens system according to each Example, a lens component of a portion of the second lens group G2 is moved as a focusing lens group. Accordingly, the weight of the focusing lens group becomes light, so that a motor for driving it can be downsized. Therefore, the lens barrel can be downsized.

In the zoom lens system according to each Example, a distance along the optical axis between the image side lens surface of the most image side lens and the image plane, which is the back focal length, is preferably from 10.0 mm to 30.0 mm in the smallest state. In the zoom lens system according to each Example, the image height is preferably from 5.0 mm to 12.5 mm, and most preferably from 5.0 mm to 9.5 mm.

The present embodiment only shows a specific example for the purpose of better understanding of the present application. Accordingly, it is needless to say that the application in its broader aspect is not limited to the specific details and representative devices.

Incidentally, the following description may suitably be applied within limits that do not deteriorate optical performance.

In the above described Examples, although a zoom lens system having a two-lens-group configuration or a three-lens-group configuration has been shown, the above described lens configuration can be applied to other lens configurations such as a four-lens-group configuration and the like. Specifically, a lens configuration in which a lens or a lens group is added to the most object side, and a lens configuration in which a lens or a lens group is added to the most image side may be possible. Incidentally, a lens group is defined as a portion having at least one lens that is separated from the other portions by air spaces that vary upon zooming.

In a zoom lens system according to the present application, in order to vary focusing from an infinitely distant object to a close object, a portion of a lens group, a single lens group or a plurality of lens groups may be moved as a focusing lens group along the optical axis. It is particularly preferable that at least a portion of the second lens group is used as the focusing lens group. In this case, the focusing lens group can be used for auto focus, and suitable for being driven by a motor such as an ultrasonic motor.

In a zoom lens system according to the present application, a lens group or a portion of a lens group may be moved in a direction having a component perpendicular to the optical axis, or swayed in a direction including the optical axis for making it as a shift lens group that corrects an image blur caused by a camera shake. It is particularly preferable that at lest a portion of the second lens group is made to be a shift lens group.

Moreover, any lens surface in a zoom lens system according to the present application may be formed as a spherical surface, a plane surface or an aspherical surface. When a lens surface is a spherical surface or a plane surface, processing and assembling become easy, so that deterioration of optical performance caused by errors upon processing and assembling can be prevented. Even if the image plane is shifted, deterioration in optical performance is small, so that it is desirable.

When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

In a zoom lens system according to the present application, although an aperture stop S is preferably disposed in the second lens group or in the vicinity thereof, the function may be substituted by a lens frame without disposing a member as an aperture stop.

An antireflection coating having high transmittance over a broad wavelength range may be applied to each lens surface in a zoom lens system according to the present application to reduce flare or ghost images, so that high optical performance with a high contrast can be achieved.

The zoom ratio of a zoom lens system according to the present application is about two to seven.

In a zoom lens system according to the present application, it is preferable that the first lens group includes two positive lens components and two negative lens components. Otherwise, the first lens group preferably includes two negative lens components and one positive lens component.

In an optical system according to the present embodiment, it is preferable that the second lens group includes two positive lens components and one negative lens component. Otherwise, the second lens group preferably includes three positive lens components and one negative lens component. Otherwise, the second lens group preferably includes four positive lens components and one negative lens component. Otherwise, the second lens group preferably includes three positive lens components.

The third lens group preferably includes one positive lens component and one negative lens component. Otherwise, the third lens group preferably includes two positive lens components.

Then, a camera equipped with a zoom lens system according to the present application is explained with reference to FIG. 25.

Figure 25:
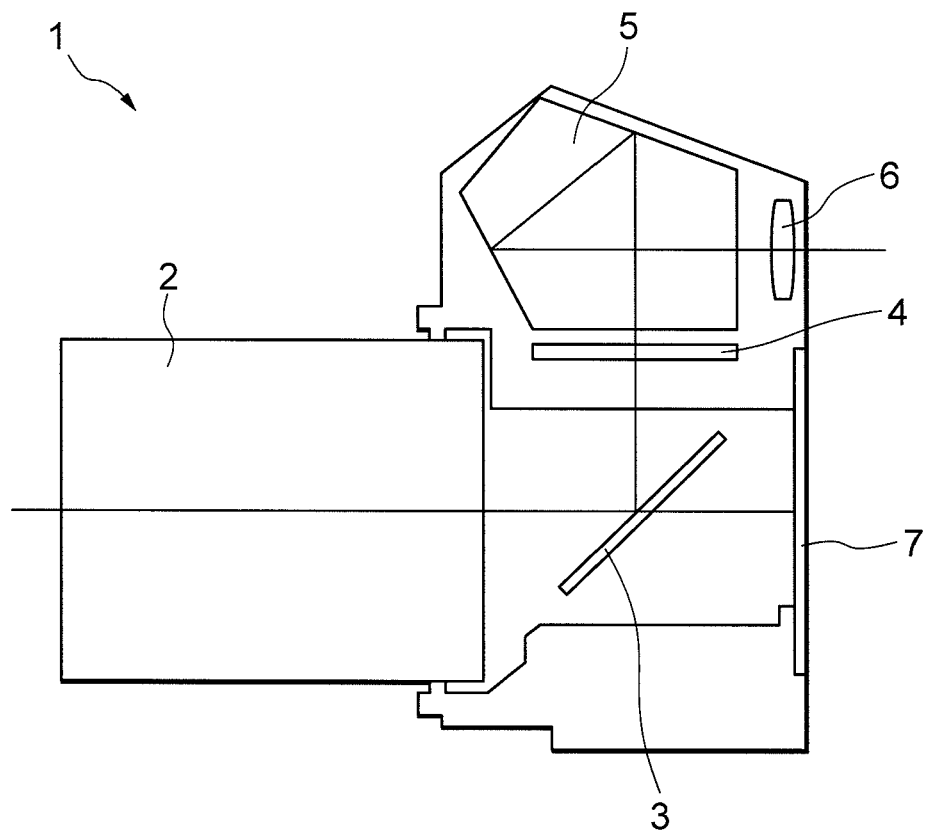
FIG. 25 is a sectional view showing a camera equipped with the zoom lens system according to the present application.

FIG. 25 is a sectional view showing a camera equipped with the zoom lens system according to the present application.

The camera 1 is a single-lens reflex digital camera equipped with the zoom lens system according to Example 1 as an imaging lens 2.

In the camera 1, light rays coming out from an object (not shown) are converged by an imaging lens 2, reflected by a quick return mirror 3, and focused on a focusing screen 4. The light rays focused on the focusing screen 4 are reflected a plurality of times in a pentagonal roof prism 5, and led to an eyepiece 6. Accordingly, a photographer can observe the object image as an erected image through the eyepiece 6.

When the photographer presses a release button (not shown) all the way down, the quick return mirror 3 is retracted from the optical path, the light rays from the object reach an imaging device 7. Accordingly, the light rays from the object are captured by the imaging device 7, and the photographed image is stored in a memory (not shown). In this manner, the photographer can take a picture of an object by the camera 1.

Here, the zoom lens system according to Example 1 installed in the camera 1 as an imaging lens 2 has excellent optical performance and compactness with the characteristic lens configuration thereof. Accordingly, the camera 1 makes it possible to realize excellent optical performance with making it compact. The same effect as the above-described camera 1 can be obtained upon constructing a camera equipped with any one of zoom lens systems according to Examples 2 through 6. Moreover, the same effect can be obtained upon installing any one of zoom lens systems according to the above-described Examples into a camera having no quick-return mirror 3.

Then, an outline of a method for manufacturing a zoom lens system according to the present application is explained with reference to FIG. 26.

Figure 26:
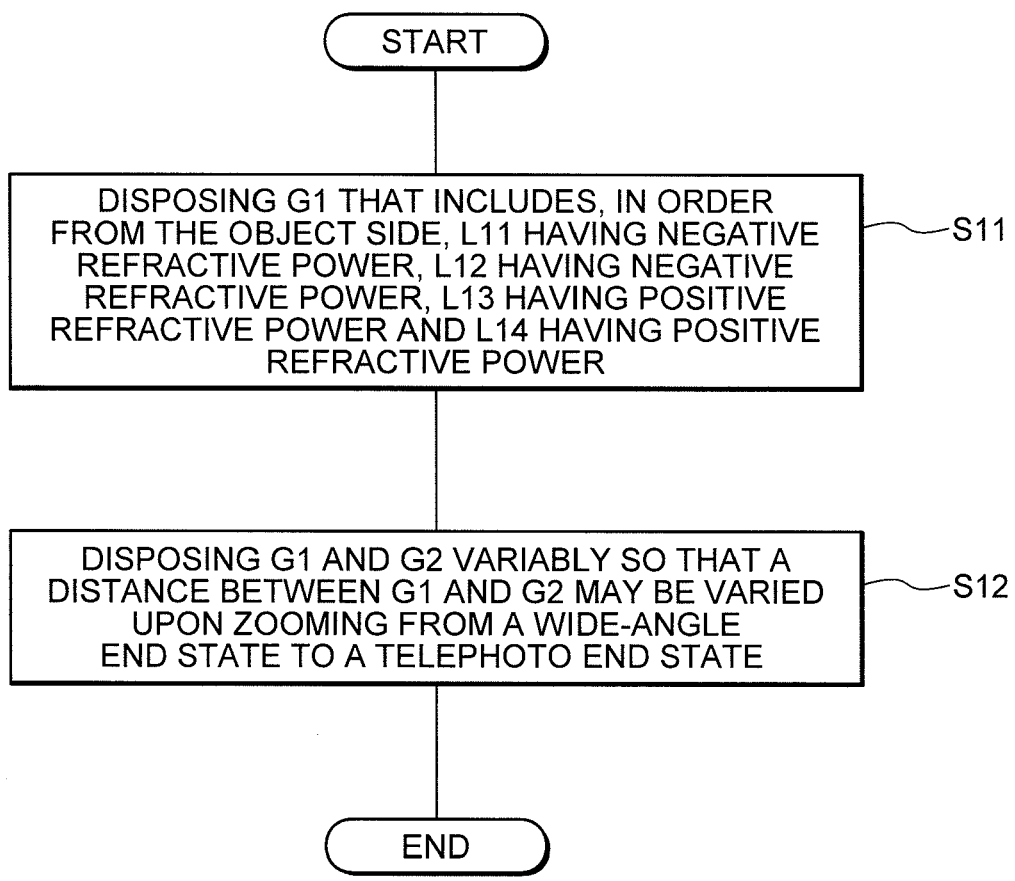
FIG. 26 is a flowchart schematically explaining a method for manufacturing the zoom lens system according to the present application.

FIG. 26 is a flowchart schematically explaining a method for manufacturing the zoom lens system according to the present application.

The method for manufacturing the zoom lens system according to the present application is a method for manufacturing a zoom lens system including, in order from an object side, a first lens group having negative refractive power and a second lens group having positive refractive power, the method including the following steps S11 and S12.

Step S11: disposing the first lens group that includes, in order from the object side, a first lens component having negative refractive power, a second lens component having negative refractive power, a third lens component having positive refractive power, and a fourth lens component having positive refractive power, and disposing the first lens group and the second lens group into a lens barrel, in order from the object side.

Step S12: disposing the first lens group and the second lens group movably by means of a well-known moving mechanism so that a distance between the first lens group and the second lens group may be varied upon zooming from a wide-angle end state to a telephoto end state.

With the method for manufacturing a zoom lens system according to the present application, it becomes possible to manufacture a downsized zoom lens system having excellent optical performance.

Then, an outline of a method for manufacturing a zoom lens system seen from another point of view according to the present application is explained with reference to FIG. 27.

FIG. 27 is a flowchart schematically explaining a method for manufacturing the zoom lens system seen from another point of view according to the present application.

The method for manufacturing the zoom lens system seen from another point of view according to the present application is a method for manufacturing a zoom lens system including, in order from an object side, a first lens group and a second lens group, the method including the following steps S21 through S23.

Step S21: disposing the second lens group such that the second lens group consists of, in order from the object side, a front sub-lens group G2a and a rear sub-lens group G2b, the front sub-lens group is composed of a plurality of lens components each having the same sign of refractive power, and the rear sub-lens group includes a lens component that is disposed to the most object side and has a different sign of refractive power from the sign of refractive power of the plurality of lens components in the front sub-lens group.

Step S22: disposing the front sub-lens group and the rear sub-lens group with satisfying conditional expression (6), and disposing the first lens group and the second lens group into a lens barrel in order from the object side:

$$0.20 < \Sigma 2a/\Sigma 2b < 18.00 \quad (6)$$

where $\Sigma 2a$ denotes a distance along an optical axis between the object side lens surface of a lens component disposed to the most object side of the front sub-lens group and the image side lens surface of a lens component disposed to the most image side of the front sub-lens group, and $\Sigma 2b$ denotes a distance along the optical axis between the object side lens surface of a lens component disposed to the most object side of the rear sub-lens group and a image side lens surface of a lens component disposed to the most object side of the rear sub-lens group.

Step S23: disposing the first lens group and the second lens group movably by means of a well-known moving mechanism so that a distance between the first lens group and the second lens group may be varied upon zooming from a wide-angle end state to a telephoto end state.

With the method for manufacturing a zoom lens system seen from another point of view according to the present application, it becomes possible to manufacture a downsized zoom lens system having excellent optical performance.

What is claimed is:

1. A zoom lens system consisting of, in order from an object side:
    a first lens group having negative refractive power; and
    a second lens group having positive refractive power,
    a distance between the first lens group and the second lens group varying upon zooming from a wide-angle end state to a telephoto end state,
    the first lens group including, in order from the object side, a first lens component having negative refractive power, a second lens component having negative refractive power, a third lens component having positive refractive power, and a fourth lens component having positive refractive power,
    wherein at least a portion of the second lens group is moved as a focusing lens group along an optical axis so as to carry out focusing from an infinitely distant object to a close object,
    the following conditional expression is satisfied:

$$0.15 < |fw/ff| < 0.45$$

where fw denotes a focal length of the zoom lens system in the wide-angle end state, and ff denotes a focal length of the focusing lens group, and
    wherein the zoom lens system includes a shift lens group including a component that shifts in a direction perpendicular to the optical axis, and wherein the following conditional expression is satisfied:

$$-3.70 < ff/fs < 3.10$$

wherein fs denotes a focal length of the shift lens group.

2. The zoom lens system according to claim 1, wherein the following conditional expression is satisfied:

$$1.15 < (-f1)/fw < 2.00$$

where f1 denotes a focal length of the first lens group, and fw denotes a focal length of the zoom lens system in the wide-angle end state.

3. The zoom lens system according to claim 1, wherein the following conditional expression is satisfied:

$$0.45 < (-f1)/ft < 0.90$$

where f1 denotes a focal length of the first lens group, and ft denotes a focal length of the zoom lens system in the telephoto end state.

4. The zoom lens system according to claim 1, wherein each of the first lens component, the third lens component and the fourth lens component in the first lens group has a meniscus shape.

5. The zoom lens system according to claim 1, wherein each of the first lens component, the third lens component and the fourth lens component in the first lens group has a meniscus shape having a convex surface facing the object side.

6. The zoom lens system according to claim 1, wherein the first lens component in the first lens group has an aspherical surface.

7. The zoom lens system of claim 1, wherein during focusing, an image plane is moved, and wherein the following conditional expression is satisfied:

$$0.15<|f\gamma w|<0.60$$

where fγw denotes an image-plane-moving coefficient of the focusing lens group, which is a ratio of a moving amount of the image plane with respect to a moving amount of the focusing lens group, in the wide-angle end state.

8. The zoom lens system according to claim 1, wherein at least a portion of the second lens group is moved as a shift lens group in a direction including a component perpendicular to an optical axis.

9. An optical apparatus equipped with the zoom lens system according to claim 1.

10. A method for manufacturing a zoom lens system consisting of, in order from an object side, a first lens group having negative refractive power and a second lens group having positive refractive power, the method comprising steps of:
   disposing the first lens group that includes, in order from the object side, a first lens component having negative refractive power, a second lens component having negative refractive power, a third lens component having positive refractive power and a fourth lens component having positive refractive power; and
   disposing the first lens group and the second lens group movably so that a distance between the first lens group and the second lens group may be varied upon zooming from a wide-angle end state to a telephoto end state,
   wherein at least a portion of the second lens group is adapted to be moved as a focusing lens group along an optical axis so as to carry out focusing from an infinitely distant object to a close object, with satisfying the following conditional expression:

$$0.15<|fw/ff|<0.45$$

where fw denotes a focal length of the zoom lens system in the wide-angle end state, and ff denotes a focal length of the focusing lens group, and
   wherein the zoom lens system includes a shift lens group including a component that shifts in a direction perpendicular to the optical axis, and wherein the following conditional expression is satisfied:

$$-3.70<ff/fs<3.10$$

where fs denotes a focal length of the shift lens group.

11. The method according to claim 10, further comprising a step of:
   disposing each lens group with satisfying the following conditional expression:

$$1.15<(-f1)/fw<2.00$$

where f1 denotes a focal length of the first lens group, and fw denotes a focal length of the zoom lens system in the wide-angle end state.

12. The method according to claim 10, further comprising a step of:
   disposing each lens group with satisfying the following conditional expression:

$$0.45<(-f1)/ft<0.90$$

where f1 denotes a focal length of the first lens group, and ft denotes a focal length of the zoom lens system in the telephoto end state.

13. The method according to claim 10, further comprising a step of:
   disposing each of the first lens component, the third lens component and the fourth lens component in the first lens group having a meniscus shape.

14. The method according to claim 10, further comprising a step of:
   moving at least a portion of the second lens group as a shift lens group in a direction including a component perpendicular to an optical axis.

15. A zoom lens system consisting of, in order from an object side:
   a first lens group having negative refractive power; and
   a second lens group having positive refractive power,
   a distance between the first lens group and the second lens group varying upon zooming from a wide-angle end state to a telephoto end state,
   the first lens group including, in order from the object side, a first lens component having negative refractive power, a second lens component having negative refractive power, a third lens component having positive refractive power, and a fourth lens component having positive refractive power,
   wherein at least a portion of the second lens group is moved as a shift lens group in a direction including a component perpendicular to an optical axis,
   wherein the zoom lens system further includes a focusing lens group that is moved along an optical axis so as to carry out focusing from an infinitely distant object to a close object, and the following condition is satisfied:

$$0.15<|fw/ff|<0.45$$

where fw denotes a focal length of the zoom lens system in the wide-angle end state, and ff denotes a focal length of the focusing lens group, and
   wherein the following conditional expression is satisfied:

$$-3.70<ff/fs<3.10$$

where fs denotes a focal length of the shift lens group.

16. A zoom lens system consisting of, in order from an object side:
   a first lens group having negative refractive power; and
   a second lens group having positive refractive power,
   a distance between the first lens group and the second lens group varying upon zooming from a wide-angle end state to a telephoto end state,
   the first lens group including, in order from the object side, a first lens component having negative refractive power, a second lens component having negative refractive power, a third lens component having positive refractive power, and a fourth lens component having positive refractive power,
   wherein the first lens component in the first lens group has an aspherical surface,
   wherein the zoom lens system further includes a focusing lens group that is moved along an optical axis so as to carry out focusing from an infinitely distant object to a close object, and the following condition is satisfied:

$0.15 < |fw/ff| < 0.45$ where fw denotes a focal length of the zoom lens system in the wide-angle end state, and ff denotes a focal length of the focusing lens group, and wherein the zoom lens includes a shift lens group including a component that shifts in a direction perpendicular to the optical axis, and wherein the following conditional expression is satisfied:

$-3.70 < ff/fs < 3.10$ where fs denotes a focal length of the shift lens group.

17. A method for manufacturing a zoom lens system consisting of, in order from an object side, a first lens group having negative refractive power and a second lens group having positive refractive power, the method comprising steps of:

disposing the first lens group that includes, in order from the object side, a first lens component having negative refractive power, a second lens component having negative refractive power, a third lens component having positive refractive power and a fourth lens component having positive refractive power; and disposing the first lens group and the second lens group movably so that a distance between the first lens group and the second lens group may be varied upon zooming from a wide-angle end state to a telephoto end state, moving at least a portion of the second lens group as a shift lens group in a direction including a component perpendicular to an optical axis, disposing a focusing lens group that is moved along an optical axis so as to carry out focusing from an infinitely distant object to a close object, with satisfying the following conditional expression:

$0.15 < |fw/ff| < 0.45$ where fw denotes a focal length of the zoom lens system in the wide-angle end state, and ff denotes a focal length of the focusing lens group, and wherein the following conditional expression is satisfied:

$-3.70 < ff/fs < 3.10$ where fs denotes a focal length of the shift lens group.

18. A method for manufacturing a zoom lens system consisting of, in order from an object side, a first lens group having negative refractive power and a second lens group having positive refractive power, the method comprising steps of:

disposing the first lens group that includes, in order from the object side, a first lens component having negative refractive power and having an aspherical surface, a second lens component having negative refractive power, a third lens component having positive refractive power and a fourth lens component having positive refractive power;

disposing the first lens group and the second lens group movably so that a distance between the first lens group and the second lens group may be varied upon zooming from a wide-angle end state to a telephoto end state, disposing a focusing lens group that is moved along an optical axis so as to carry out focusing from an infinitely distant object to a close object, with satisfying the following conditional expression:

$0.15 < |fw/ff| < 0.45$ where fw denotes a focal length of the zoom lens system in the wide-angle end state, and ff denotes a focal length of the focusing lens group, and wherein the zoom lens system includes a shift lens group including a component that shifts in a direction perpendicular to the optical axis, and wherein the following conditional expression is satisfied:

$-3.70 < ff/fs < 3.10$ where fs denotes a focal length of the shift lens group.

19. A zoom lens system consisting of, in order from an object side:

a first lens group having negative refractive power; and a second lens group having positive refractive power, a distance between the first lens group and the second lens group varying upon zooming from a wide-angle end state to a telephoto end state, the first lens group including, in order from the object side, a first lens component having negative refractive power, a second lens component having negative refractive power, a third lens component having positive refractive power, and a fourth lens component having positive refractive power, wherein at least a portion of the second lens group is moved as a focusing lens group along an optical axis so as to carry out focusing from an infinitely distant object to a close object, and the following conditional expression is satisfied:

$0.15 < |fw/ff| \le 0.381$ where fw denotes a focal length of the zoom lens system in the wide-angle end state, and ff denotes a focal length of the focusing lens group.

20. A method for manufacturing a zoom lens system consisting of, in order from an object side, a first lens group having negative refractive power and a second lens group having positive refractive power, the method comprising steps of:

disposing the first lens group that includes, in order from the object side, a first lens component having negative refractive power, a second lens component having negative refractive power, a third lens component having positive refractive power and a fourth lens component having positive refractive power; and disposing the first lens group and the second lens group movably so that a distance between the first lens group and the second lens group may be varied upon zooming from a wide-angle end state to a telephoto end state, wherein at least a portion of the second lens group is adapted to be moved as a focusing lens group along an optical axis so as to carry out focusing from an infinitely distant object to a close object, with satisfying the following conditional expression:

$0.15 < |fw/ff| 0.381$ where fw denotes a focal length of the zoom lens system in the wide-angle end state, and ff denotes a focal length of the focusing lens group.

* * * * *